(12) United States Patent
Nelson et al.

(10) Patent No.: US 9,939,824 B2
(45) Date of Patent: Apr. 10, 2018

(54) THERMOSTAT WITH REMOTE ACCESS FEATURE

(75) Inventors: Jay Nelson, Eden Prairie, MN (US); Nicholas Dalsin, Minneapolis, MN (US); Amy L. Anderson, Ramsey, MN (US); Shilpa Anand, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1747 days.

(21) Appl. No.: 13/269,419

(22) Filed: Oct. 7, 2011

(65) Prior Publication Data

US 2013/0087628 A1 Apr. 11, 2013

(51) Int. Cl.
| G05D 23/00 | (2006.01) |
| F25B 29/00 | (2006.01) |
| F25B 7/00 | (2006.01) |
| G05D 23/19 | (2006.01) |
| F24F 11/00 | (2018.01) |

(52) U.S. Cl.
CPC ...... *G05D 23/1934* (2013.01); *F24F 11/0012* (2013.01); *G05D 23/1905* (2013.01); *F24F 2011/0068* (2013.01)

(58) Field of Classification Search
USPC ............... 236/51; 165/201; 62/175; 700/277
See application file for complete search history.

(56) References Cited

U.S. PATENT DOCUMENTS

| 4,843,084 A * | 6/1989 | Parker et al. ................. 700/277 |
| 4,931,948 A | 6/1990 | Parker et al. | |
| 5,950,709 A | 9/1999 | Krueger et al. | |
| 6,116,512 A | 9/2000 | Dushane et al. | |
| 6,260,765 B1 | 7/2001 | Natale et al. | |
| 6,628,997 B1 | 9/2003 | Fox et al. | |
| 7,055,758 B2 | 6/2006 | Morenzin et al. | |
| 7,222,800 B2 | 5/2007 | Wruck | |
| 7,232,075 B1 | 6/2007 | Rosen | |
| 7,434,742 B2 | 10/2008 | Mueller et al. | |

(Continued)

FOREIGN PATENT DOCUMENTS

DE 4221094 A1 1/1994

OTHER PUBLICATIONS

Lennox Controls, "Network Thermostat Controller NTC1-1 Kit", Installation Instructions for Network Thermostat Controller Kit (LB-100354; 17M10) Used with Units Not Equipped with an IMC, 20 Pages, Oct. 2006.

(Continued)

*Primary Examiner* — Henry Crenshaw
(74) *Attorney, Agent, or Firm* — Seager, Tufte & Wickhem, LLP

(57) ABSTRACT

A local thermostat for controlling an HVAC unit may include a controller programmed to execute a remote access function for remotely accessing and communicating with at least one remote thermostat over a communication channel. The remote access application may be configured to display at least one thermostat setting of at least one of the remote thermostats on the display of the user interface of the local thermostat. In some cases, the remote access application may allow a user to change one or more thermostat settings of at least one remote thermostat using the user interface of the local thermostat.

20 Claims, 27 Drawing Sheets

(56) References Cited

U.S. PATENT DOCUMENTS

| | | |
|---|---|---|
| 7,454,269 B1 | 11/2008 | Dushane et al. |
| 7,809,472 B1 | 10/2010 | Silva et al. |
| 7,890,195 B2* | 2/2011 | Bergman et al. ............... 700/17 |
| 7,908,116 B2 | 3/2011 | Steinberg et al. |
| 7,908,117 B2 | 3/2011 | Steinberg et al. |
| 8,032,254 B2* | 10/2011 | Amundson et al. .......... 700/276 |
| 8,167,216 B2* | 5/2012 | Schultz et al. ................... 236/51 |
| 8,199,005 B2* | 6/2012 | Thomas et al. ............... 340/540 |
| 8,224,491 B2* | 7/2012 | Koster et al. ................. 700/277 |
| 8,442,693 B2* | 5/2013 | Mirza et al. .................. 700/276 |
| 2003/0034898 A1 | 2/2003 | Shamoon et al. |
| 2005/0040250 A1 | 2/2005 | Wruck |
| 2005/0270151 A1* | 12/2005 | Winick ...................... 340/539.1 |
| 2006/0196953 A1 | 9/2006 | Simon et al. |
| 2007/0114295 A1 | 5/2007 | Jenkins |
| 2007/0210177 A1 | 9/2007 | Karasek |
| 2008/0006708 A1 | 1/2008 | Gauger et al. |
| 2008/0048046 A1 | 2/2008 | Wagner et al. |
| 2008/0053122 A1* | 3/2008 | Yokoi ............................. 62/175 |
| 2008/0133060 A1* | 6/2008 | Hoglund et al. .............. 700/277 |
| 2008/0223943 A1 | 9/2008 | Mulhouse et al. |
| 2009/0140058 A1 | 6/2009 | Koster et al. |
| 2009/0140060 A1 | 6/2009 | Stoner et al. |
| 2009/0140061 A1* | 6/2009 | Schultz et al. .................. 236/51 |
| 2009/0140063 A1 | 6/2009 | Koster et al. ................... 236/51 |
| 2009/0140064 A1* | 6/2009 | Schultz et al. .................. 236/51 |
| 2009/0143918 A1 | 6/2009 | Amundson et al. |
| 2010/0107111 A1* | 4/2010 | Mirza et al. .................. 715/777 |
| 2010/0168924 A1 | 7/2010 | Tessier et al. |
| 2011/0077780 A1* | 3/2011 | Hoglund et al. .............. 700/277 |

OTHER PUBLICATIONS

Lennox Engineering Data, "L Connection Network", NCP Network Control Panel, 5 pages, Feb. 2000.

http://en.wikipedia.org/wiki/Remote_Desktop_Services, "Remote Desktop Services", 7 pages, printed Dec. 21, 2011.

\* cited by examiner

Please wait while the system saves your changes.

THERMOSTAT WITH REMOTE ACCESS FEATURE

TECHNICAL FIELD

This disclosure generally relates to HVAC systems, and more particularly, to HVAC controllers that are used to control such HVAC systems.

BACKGROUND

Heating, ventilation, and/or air conditioning (HVAC) systems are often used to control the comfort level within a building or other structure. Many HVAC controllers include a controller that activates and deactivates one or more HVAC components of the HVAC system to affect and control one or more environmental conditions within the building. These environmental conditions can include, but are not limited to, temperature, humidity, and/or ventilation.

Many HVAC controllers have a user interface that can be used to program or otherwise operate the HVAC controller. By interacting with the user interface, the user may, for example, change a set point, program a schedule, specify the particular HVAC components that are connected to the HVAC controller, enable or disable certain HVAC components, and/or perform other action or tasks. In most cases, in order to program or otherwise operate an HVAC controller, the user must physically walk up to the HVAC controller and manually interact with the user interface.

In zoned systems, which typically include an HVAC controller in each of several zones, the user must typically walk up to each HVAC controller in the zone HVAC system to program or otherwise operate the various HVAC controllers. This can be time consuming, tedious and error prone.

SUMMARY

The present disclosure generally relates to HVAC controllers such as thermostats, and more particularly, to HVAC controllers that may be used to remotely access and/or control another HVAC controller from a remote location. In one illustrative example, a first HVAC controller may be configured to display at least one HVAC controller setting from at least a second HVAC controller, such that the at least one HVAC controller setting of at least the second HVAC controller may be remotely manipulated through the user interface of the first HVAC controller.

In some cases, the HVAC controller may be a local thermostat that includes a temperature sensor, a user interface including a display, a communication port for communicating with at least one remote thermostat over a communication channel, and a controller. In some instances, the controller of the local thermostat may be programmed to execute a remote access application for remotely accessing and communicating with at least the remote thermostat via the communication port. The remote access application may be configured to display at least one thermostat setting of at least the remote thermostat on the display of the user interface of the local thermostat, and may facilitate making a change to at least one thermostat setting of at least the remote thermostat via the user interface of the local thermostat. In some cases, the remote access application may indicate on the display of the local thermostat which thermostat the currently displayed thermostat settings relate. In some instances, two or more remote thermostats may be selected via the user interface of the local thermostat, and changes made to one or more thermostat settings via the local user interface may be communicated and applied to each of the selected remote thermostats.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIGS. 6-27 show several illustrative views of various display screens that may be displayed by an HVAC controller during use.

Figure 1:
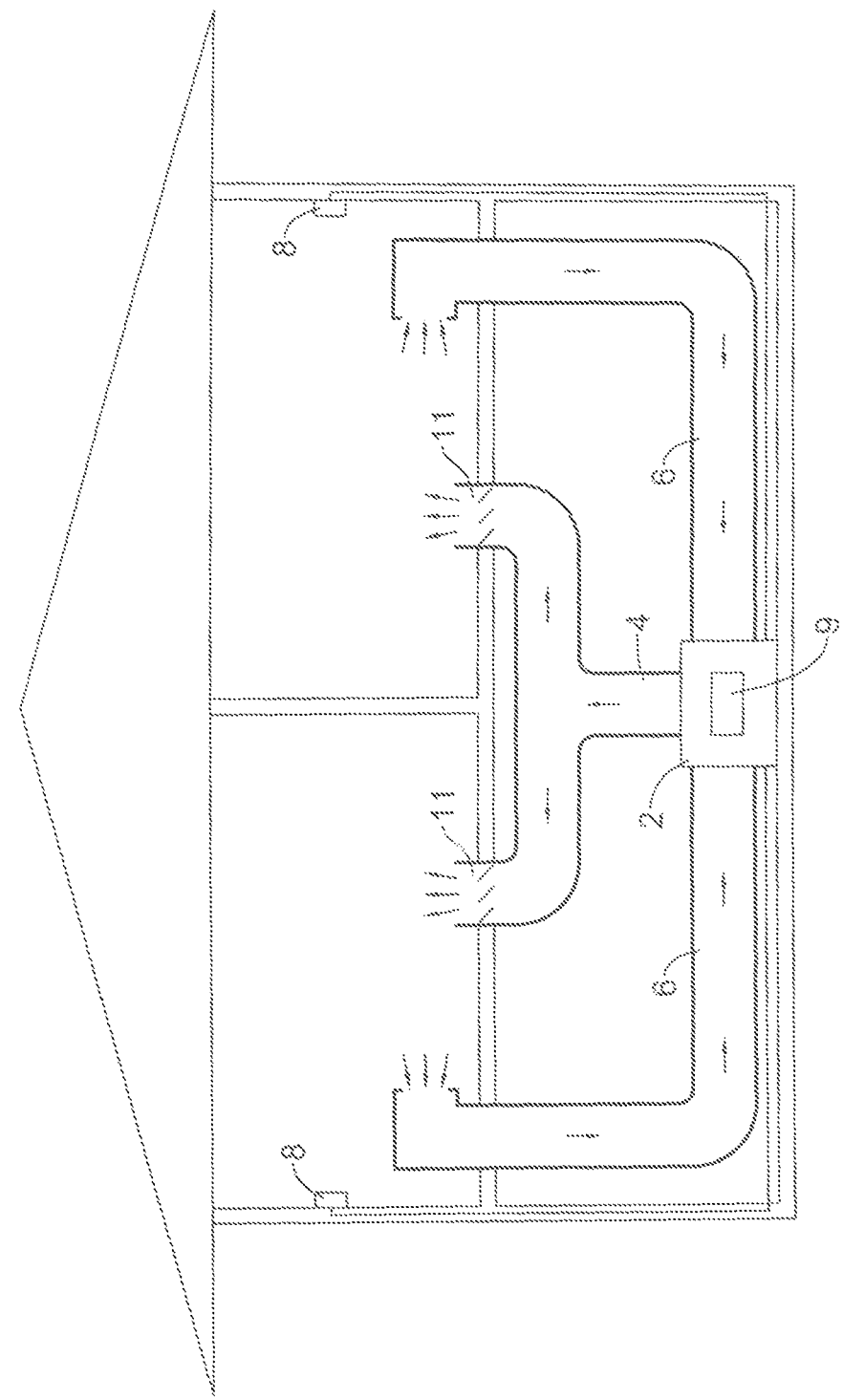
FIG. 1 is a schematic view of a building or other structure having at least one illustrative heating, ventilation, and air conditioning (HVAC) system.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples which are meant to be illustrative of the claimed disclosure.

FIG. 1 is a schematic view of a building or other structure having at least one illustrative heating, ventilation, and air conditioning (HVAC) system. While FIG. 1 shows a typical forced air type HVAC system, other types of HVAC systems may be used including hydronic systems, radiant heating systems, electric heating systems, or any other suitable type of HVAC system, as desired. The HVAC system shown in FIG. 1 includes one or more HVAC components 2, a system of vents or ductwork 4 and 6, and one or more HVAC controllers 8. The one or more HVAC components 2 may include, but are not limited to, a furnace, a heat pump, an electric heating unit, an air conditioning unit, a humidifier, a dehumidifier, an air exchanger, an air cleaner, a damper, and/or the like.

In the illustrative HVAC system of FIG. 1, the one or more HVAC components 2 can provide heated air (and/or cooled air) via the ductwork throughout the building or other structure. As illustrated, the one or more HVAC components 2 may be in fluid communication with every room and/or zone in the building or other structure via the ductwork 4 and 6. In operation, when a heat call signal is provided by one or more of the HVAC controllers 8, one or more HVAC components 2 (e.g. forced warm air furnace) may be activated to supply heated air to one or more rooms and/or zones within the building or other structure via supply air ducts 4. The heated air may be forced through supply air duct 4 by a blower or fan 9. In this example, the cooler air from each zone may be returned to the one or more HVAC components 2 (e.g. forced warm air furnace) for heating via return air ducts 6. Similarly, when a cool call signal is provided by one or more of the HVAC controllers 8, the one or more HVAC components 2 (e.g. air conditioning unit) may be activated to supply cooled air to one or more rooms and/or zones within the building or other structure via supply air ducts 4. The cooled air may be forced through supply air duct 4 by the blower or fan 9. In this example, the warmer air from each zone may be returned to the one or more HVAC components 2 (e.g. air conditioning unit) for cooling via return air ducts 6.

In some cases, the system of vents or ductwork 4 and 6 can include one or more dampers 11 to regulate the flow of air. For example, one or more dampers 11 may be coupled to one or more of the HVAC controllers 8, and can be coordinated with the operation of one or more HVAC components 2. The one or more HVAC controllers 8 may actuate dampers 11 to an open position, a closed position, and/or a partially open position to modulate the flow of conditioned air from the one or more HVAC components 2 to an appropriate room and/or zone in the building or other structure. The dampers 11 may be particularly useful in zoned HVAC systems, and may be used to control which zone(s) receives conditioned air from the HVAC components 2.

In some embodiments, it is contemplated that the one or more HVAC controllers 8 may be configured to control the comfort level of the building or structure by activating and/or deactivating the one or more HVAC components 2. In some cases, the one or more HVAC controllers 8 may be a thermostat, such as, for example, a wall mountable thermostat, but this is not required in all embodiments. In some embodiments, the HVAC controllers 8 may be zone controllers, each controlling the comfort level within a particular zone in the building or other structure.

Figure 2:
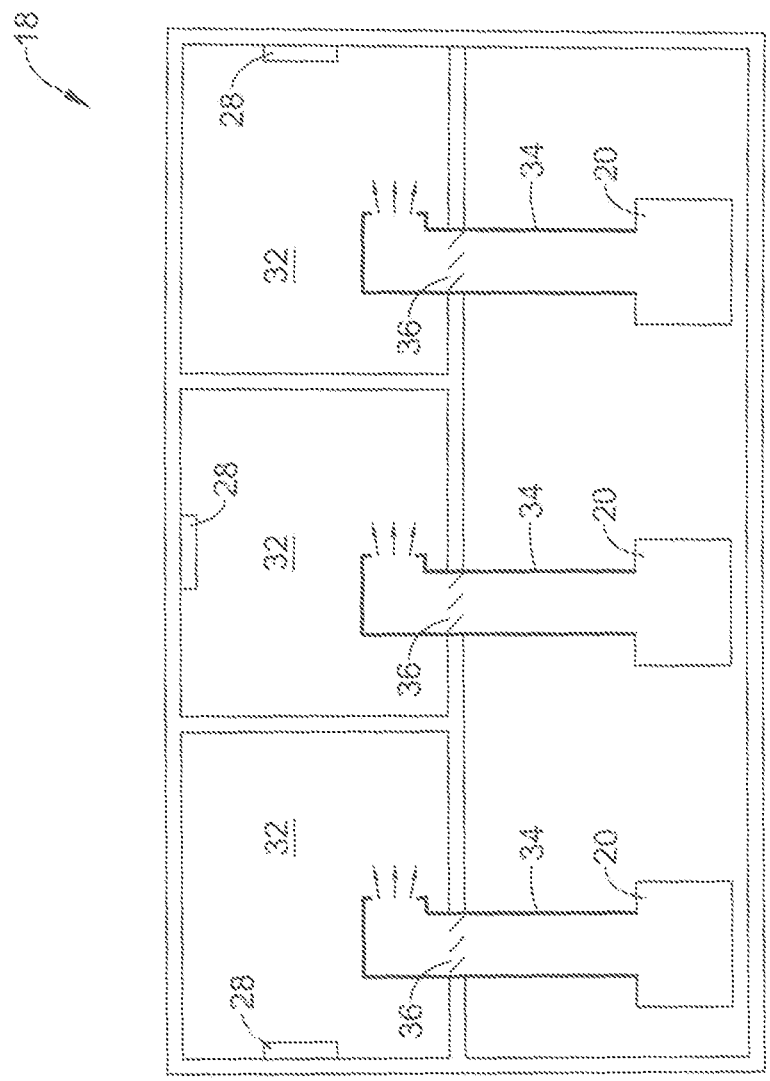
FIG. 2 is a schematic view of a building or other structure including multiple illustrative HVAC components and multiple HVAC controllers.

FIG. 2 is a schematic view of a building or other structure 18 including one or more illustrative HVAC components 20 and one or more HVAC controllers 28. Each of the one or more HVAC components 20 and the one or more HVAC controllers 28 may be located in separate locations 32 of the building 18, and may be used to control the environmental conditions particular to that location. In some cases, the location 32 may be a room or group of rooms within the building. The location 32 may include a zone or group of zones within the building that are not necessarily separated by walls. In other cases, each of the one or more HVAC components 20 and the one or more HVAC controllers 28 may be located in multiple buildings such as, for example, multiple buildings that may be found on a school campus. Each of the HVAC controllers 28 may be adapted to communicate with and control, at least in part, one or more corresponding HVAC components 20 appropriate to its location. The one or more HVAC components 20 may include, but are not limited to, a furnace, a heat pump, an electric heating unit, an air conditioning unit, a humidifier, a dehumidifier, an air exchanger, an air cleaner, and/or the like. The one or more HVAC components 20 may provide heated air and/or cooled air via corresponding venting and ductwork 34 to the particular location 32 within the building 18 that the one or more HVAC components 20 are associated with. In some cases, the system of vents and/or ductwork 34 can include one or more dampers 36 to regulate the flow of air to a particular location 32. For example, one or more dampers 36 may be coupled to one or more of the HVAC controllers 28 and can be coordinated with the operation of one or more HVAC components 20. The one or more HVAC controllers 28 may actuate dampers 36 to an open position, a closed position, and/or a partially open position to modulate the flow of air from the one or more HVAC components 20 to the appropriate location 32 in the building or other structure. Although not explicitly shown in FIG. 2, it is contemplated that each of the one more HVAC components 20 may be a rooftop unit.

In some cases, it may be desirable for the user to be able to remotely access and/or change a parameter setting of at least one HVAC controller 28 that is located in a different region or zone of the building 18 from the user's current location within the building. In some cases, each or some of the HVAC controllers 28 may be configured to enable the user to access at least one other HVAC controller 28 located in a different and/or separate location from the user's current location, and in some cases, to make a change to at least one parameter setting of that other HVAC controller 28 through the user interface of the HVAC controller 28 that is at the user's current location.

Figure 3:
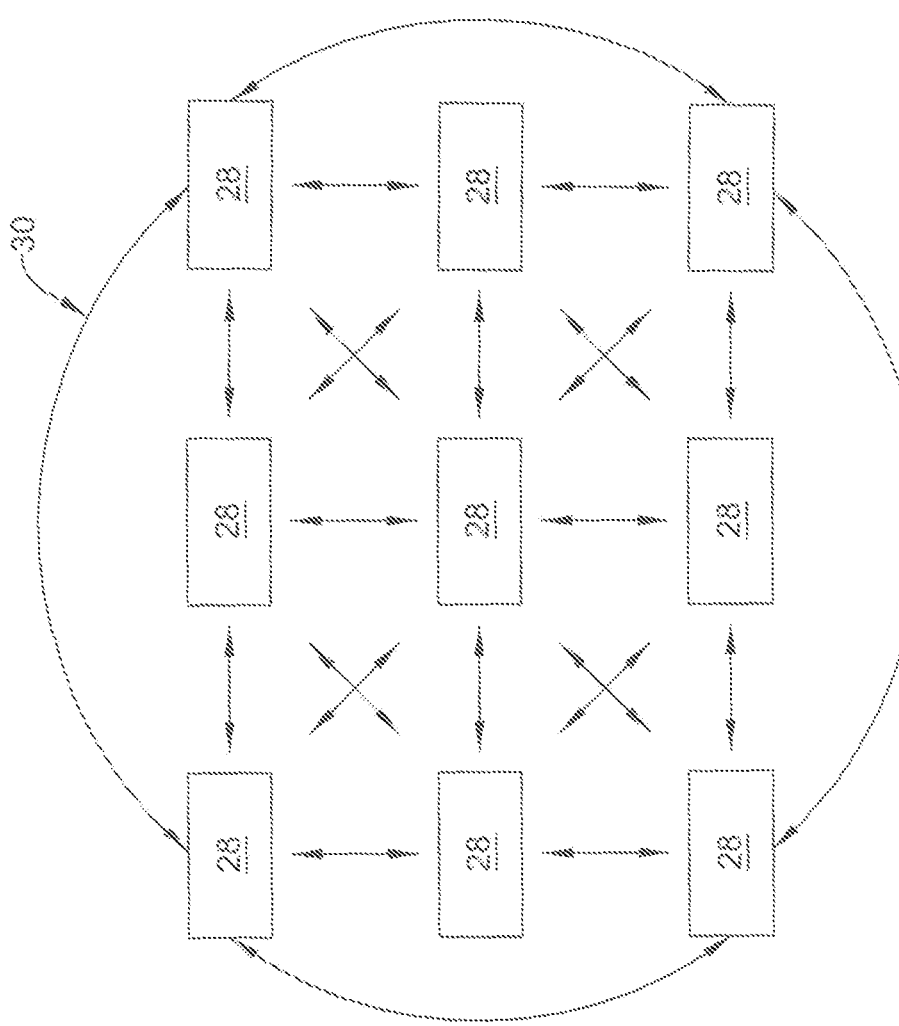
FIG. 3 is a schematic view of a plurality of HVAC controllers in communication with one another over a communication network.

FIG. 3 is a schematic view of a plurality of HVAC controllers 28 that are in communication with one another over a communication network 30. Each of the HVAC controllers 28 may be adapted to communicate with at least one other HVAC controller 28 over the communication network 30. The communication network 30 can be any type of communications network including any sort of a wired or wireless communication network 30. In many cases, the HVAC controllers 28 may be adapted for two-way communication, such that any (or some) of the HVAC controllers 28 may be accessed by another HVAC controller 28 on the network. In other cases, any (or some) of the HVAC controllers 28 may be adapted for one way communication such as, for example, in a master-slave configuration. In some cases, the HVAC controllers 28 may be located in different rooms and/or zones of a building, and may each be coupled to common or separate HVAC units, depending on the installation. In some cases, each of the HVAC controllers 28 may function as zone controllers. As further described herein, such an arrangement, with the ability to communicate with one another, may be used to help reduce the need for a user to physically walk over to each of the HVAC controllers 28, especially those located in remote locations away from the user's current location, in order to change a setting of the remote HVAC controller 28. This may be particularly useful in cases where schedule changes, routine maintenance or other setting changes are desired across several of the HVAC controllers 28. That is, instead of manually walking over to and physically accessing each individual HVAC controller 28, a user may only need to physically access a single HVAC controller 28, and use that user interface of that HVAC controller 28 to access and/or control the other HVAC controllers 28 within the building or other structure.

Figure 4:
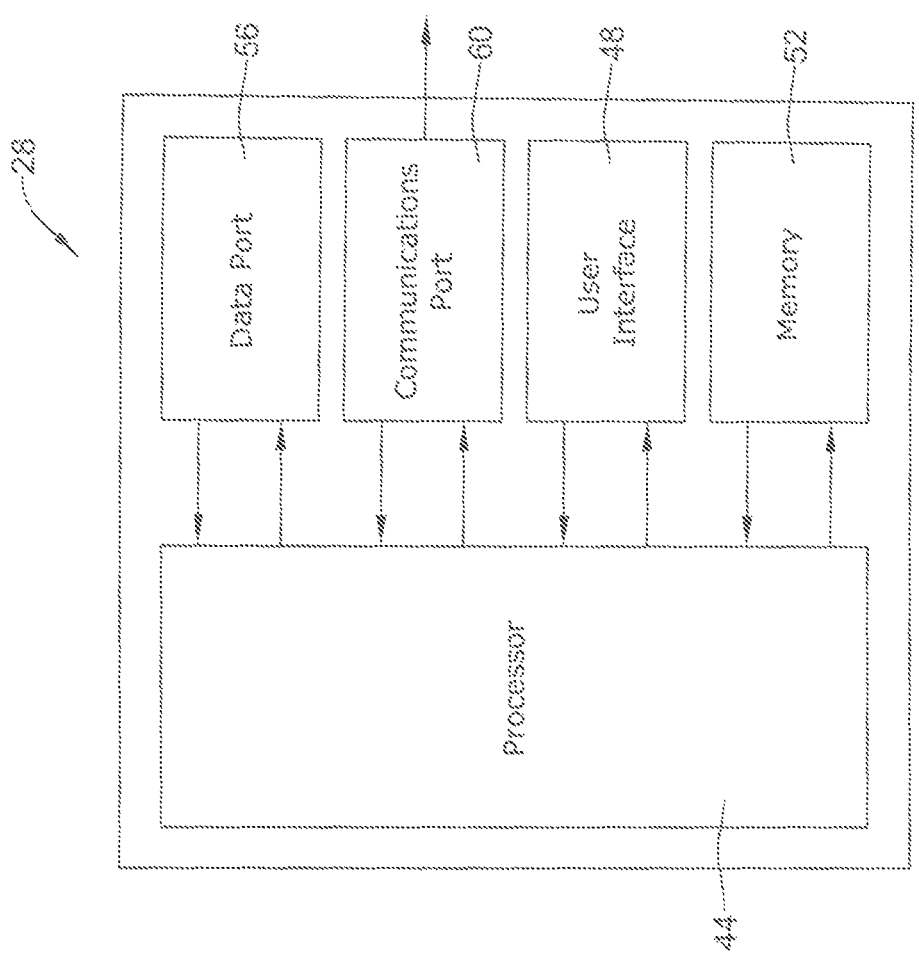
FIG. 4 is a schematic view of an illustrative HVAC controller.

FIG. 4 is a schematic view of an illustrative HVAC controller 28. In some instances, the illustrative HVAC controller 28 may be a thermostat, but this is not required. In FIG. 4, HVAC controller 28 includes a processor 44 (e.g., microprocessor, microcontroller, etc.) and a user interface 48. The processor 44 may be adapted to operate in accordance with an algorithm that at least partially controls one or more HVAC components of an HVAC system such as, for example, the HVAC systems shown in FIGS. 1 and 2. The processor 44 may, for example, operate in accordance with an algorithm that provides temperature set points, a schedule including starting and/or ending times, and the like. In some cases, HVAC controller 28 may include a timer (not shown). The timer may be integral to the processor 44 or may be provided as a separate component. In some cases, the user interface 48 including the display 62 of FIG. 5 may be provided separately from the processor 44 such that together they function as a thermostat.

In many cases, as will be described in further detail below, the processor 44 may be configured or programmed to execute a remote access application for remotely accessing and communicating with at least one additional HVAC controller 28 located in a different (e.g. remote) location of the building structure such as, for example, illustrated in FIG. 2. In some cases, the processor 44 may be configured or programmed to include a remote access application for remotely accessing and communicating with two or more additional HVAC controllers 28. Each of the two or more additional HVAC controllers 28 may be located in different and separate locations from one another and from the local HVAC controller 28. Through the remote access application, the processor 44 may display at least one thermostat setting from at least one of the remote HVAC controllers 28 on the display of the user interface of the local HVAC controller 28. In some cases, the remote access application may facilitate a user in making at least one change to at least one parameter setting of one or more of the remote HVAC controllers 28 located in a different and separate location through the user interface 48 of the local HVAC controller 28. Exemplary parameter settings include, but are not limited to, temperature set point points, scheduling parameters, humidity set points, starting times, ending times, and the like. In some instances, the remote access application may allow a user to make changes to one or more installer configuration settings of one or more of the remote HVAC controllers 28 through the user interface 48 of the local HVAC controller 28.

It is contemplated that the user interface 48 may be any suitable user interface that permits HVAC controller 28 to display and/or solicit information, and in some cases, allows a user to enter data such as temperature set points, humidity set points, starting times, ending times, installer configurations, and the like. In some cases, user interface 48 may include a display and a distinct keypad. The display may be any suitable display. In some instances, the display may be a liquid crystal display (LCD), such as a fixed segment LCD display or a dot matrix LCD display. If desired, user interface 48 may include a touch screen LCD display that functions as both a display and a keypad. In some instances, a touch screen LCD panel may be adapted to solicit values for a number of operating parameters and/or to receive such values, but this is not required.

The illustrative HVAC controller 28 of FIG. 4 includes a memory 52 that may be in communication with processor 44. Memory 52 may be used to store any desired information, such as the aforementioned control algorithm, set points, schedule information, differential pressure limits, installer configurations, and the like. Processor 44 may store information within memory 52 and may subsequently retrieve the stored information. Memory 52 may be any suitable type of storage device including, but not limited to, RAM, ROM, EPROM, flash memory, a hard drive, and the like.

In some cases, such as illustrated in FIG. 4, HVAC controller 28 may include a data port 56. Data port 56 may be configured to communicate with processor 44 and may, if desired, be used to either upload information to HVAC controller 28 or to download information from HVAC controller 28. Information that can be uploaded and/or downloaded may include values of operating parameters, schedule parameters, installation settings, and/or any other suitable information, as desired. In some instances, data port 56 may be used to upload a previously-created thermostat configuration into HVAC controller 28, thereby hastening the programming process. In some cases, data port 56 may be used to download a thermostat configuration that has been created using HVAC controller 28, so that the thermostat configuration may be later uploaded and used in other thermostats. In some cases, data port 56 may be used to upload and/or download information pertaining to an HVAC dealer or contractor. In some cases, data port 56 may be a wireless port such as a Bluetooth™ port or any other wireless protocol. In other cases, data port 56 may be a wired port such as a serial port, a parallel port, a CAT5 port, a USB (universal serial bus) port, or the like. In some instances, data port 56 may be a USB port and may be used to download and/or upload information from a USB flash drive. Other storage devices may also be employed, as desired.

In some instances, the HVAC controller 28 may also include at least one communication port 60 for communicating with at least one other device over a communication network or channel. In many cases, the at least one other device may be another HVAC controller 28 located in another zone or region of the building structure. In some cases, the communication port 60 may include a transmitter/receiver for sending and/or receiving information to and/or from a remote HVAC controller 28. In examples in which the HVAC controllers 28 are connected to and communicate over a wireless network, the transmitter/receiver may be a wireless transmitter/receiver.

The communication network over which the HVAC controller 28 may communicate with other remotely located HVAC controllers 28 may be a wired and/or wireless network. In some cases, the network may be a secure network requiring an access code and/or login credentials. In some cases, different login credentials may grant users different levels of access and control over, for example, a single thermostat or a group of thermostats. Exemplary communication networks may include, but are not limited to, local area networks (LAN), local operating networks (LON), wide area networks (WAN), point-to-point networks, storage area networks, system area networks, server area networks, small area networks (all sometimes referred to as SAN), campus area networks, controller area networks, cluster area networks (all sometimes referred to as CAN), a BACnet network, or any other suitable communication network having one or more communication channels between devices. In some cases, the communication network over which the HVAC controllers 28 communicate may be separate from an IT network operating within the building. This may permit installation of a network of HVAC controllers 28 without disturbing an existing IT network. Additionally, it may permit maintenance to be performed on one or more HVAC controllers 28 without affecting those devices operating on the IT network. However, this is not required. In some cases, the HVAC controllers 28 may be configured to communicate over an IT network.

Figure 5:
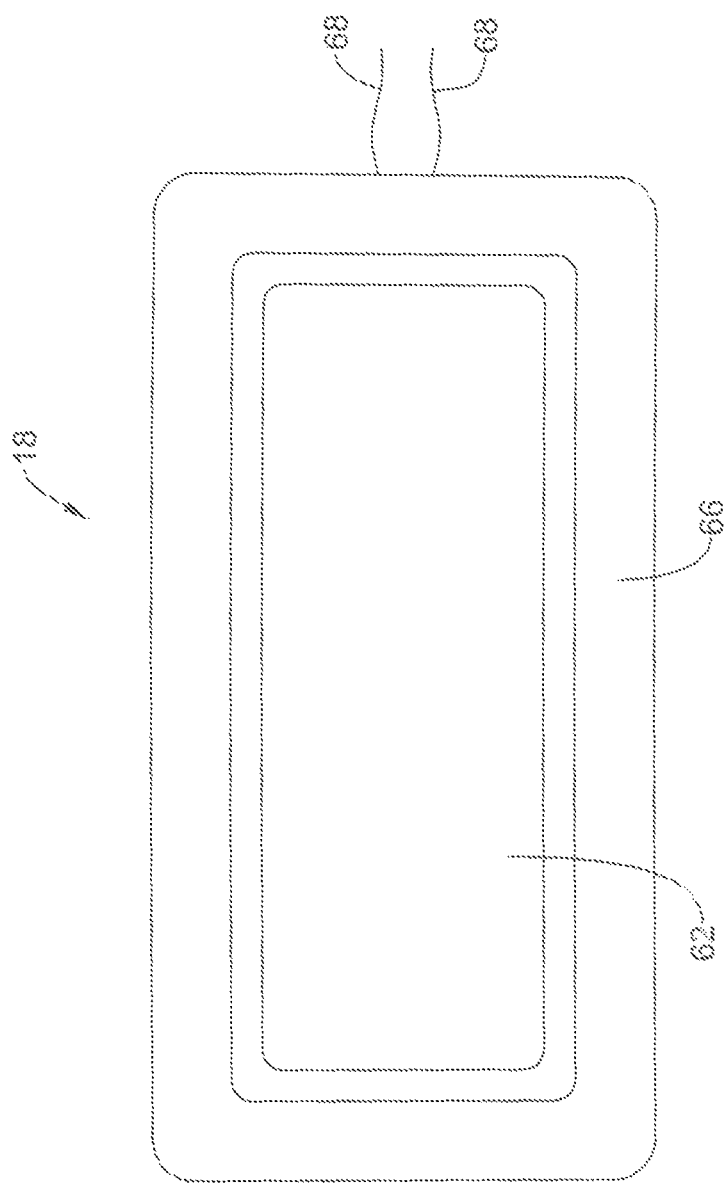
FIG. 5 is a front, schematic view of an illustrative display for an HVAC controller.

FIG. 5 is a front view of an illustrative HVAC controller 28 having a display 62 disposed within an outer housing 66. In some cases, display 62 may be a touch screen display. If desired, display 62 may be a dot matrix touch screen LCD display. A dot matrix touch screen LCD display is a touch screen LCD that permits images such as letters, numbers, graphics, and the like to be displayed anywhere on the LCD, rather than being confined to predetermined locations such as is the case with a fixed segment LCD display. Housing 66 may be formed of any suitable material, such as a polymeric material. In some cases, the housing 66 may be formed such that it defines data port 56 (see FIG. 4). The housing 66 may also include suitable wiring and/or other electrical connections 68 such that the HVAC controller 28 may be electrically coupled to the building and/or HVAC system.

Figure 6:
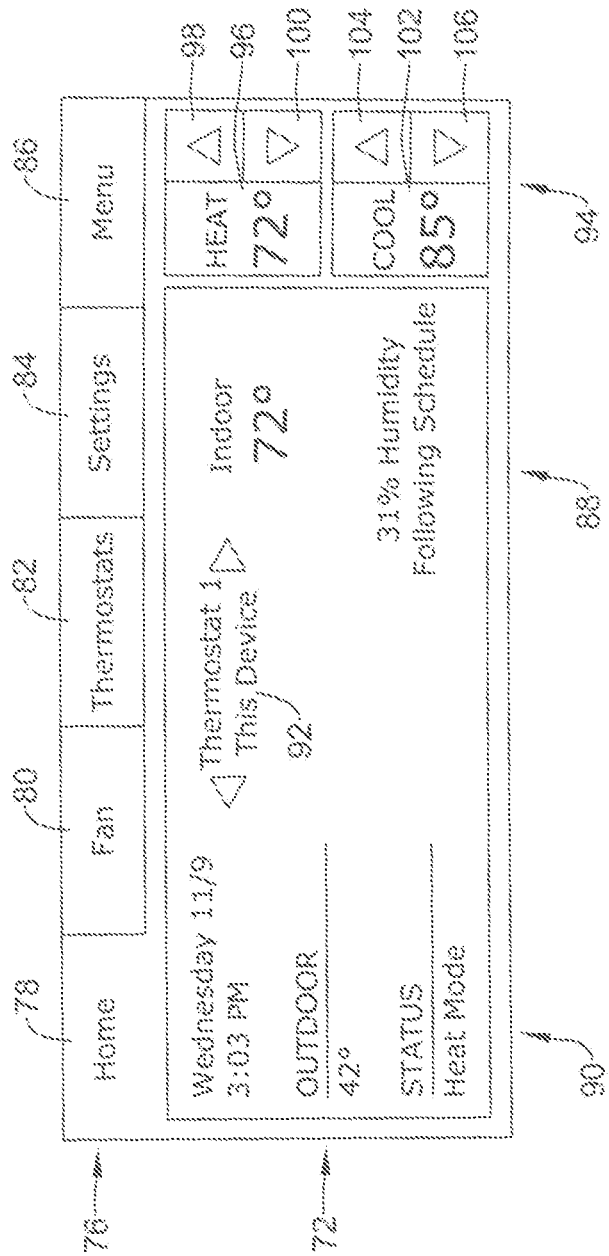

In some cases, the illustrative HVAC controller 28 may be configured to provide substantial display and/or programming functionality, but this is not required. In some cases, HVAC controller 28 may be configured to display a default display, also referred to herein as a home screen, after no other data entry or other user interaction is received for a period of time. FIG. 6 shows an example home screen 72 that may be displayed by HVAC controller 28. In some cases, home screens may include screens that can be accessed by a top level navigational menu. A home screen may, if desired, display one or more parameters relating to environmental conditions such as indoor and/or outdoor temperature and/or humidity, expected weather conditions, and/or the status of equipment that is at least partially controlled by HVAC controller 28.

As shown in FIG. 6, the display 62 may display an illustrative home screen 72 that includes a navigational bar 76 along the top. Navigational bar 76 may be considered as providing top level navigation, but this is not required. In some cases, if desired, navigational bar 76 may include one or more of a HOME button 78, a FAN button 80, a THERMOSTATS button 82, a SETTINGS button 84, and/or a MENU button 86. FIG. 6 is an example of a home screen that may be displayed after a user has pushed HOME button 78.

In the example shown, the home screen 72 may be considered as having two or more regions. For example, home screen 72 may include a first region 88 and a second region 90. In some instances, first region 88 may be considered as displaying or otherwise providing primary information, while second region 90 may be considered as displaying or otherwise providing secondary information. In some cases, primary information may be information that is considered to be more important, more interesting and/or more useful than secondary information. To illustrate, first region 88 may display one or more of a current temperature reading, a current indoor humidity, a schedule status, and the like. In addition, the first region 88 may display a thermostat identifier 92 identifying the thermostat from which the information is currently displayed and, in some cases, the building location of the thermostat. In some instances the thermostat may include a thermostat name such as, for example, THERMOSTAT 1 and/or a simple description of the thermostat's location such as, for example, OFFICE. In still other cases, thermostat identifier 92 may include a building icon showing the location of thermostat from which information is currently displayed. In the illustrative embodiment, second region 90 may display one or more of a date and time, an outdoor temperature reading, an outdoor humidity reading, an equipment status, and the like.

Home screen 72 may also include a third region 94 that may be used for displaying and/or adjusting a parameter value such as a parameter that is displayed within first region 88 of home screen 72. In some cases, for example, third region 94 may, as illustrated, display both a heating temperature set point and a cooling temperature set point, but this is not required. Third region 94 may include a first parameter 96, a first up arrow 98 and a first down arrow 100. Third region 94 may include a second parameter 102, a second up arrow 104 and a second down arrow 106. First parameter 96 may be adjusted up or down using first up arrow 98 and/or first down arrow 100, as appropriate. Similarly, second parameter 102 may be adjusted up or down using second up arrow 104 and/or second down arrow 106, as appropriate. In some cases, as will be described in greater detail herein, the arrows 98, 100, 104, and/or 106 may be used to adjust a first and/or a second parameter of a remote thermostat located in a separate room or zone of the building from the local thermostat.

Figure 7:
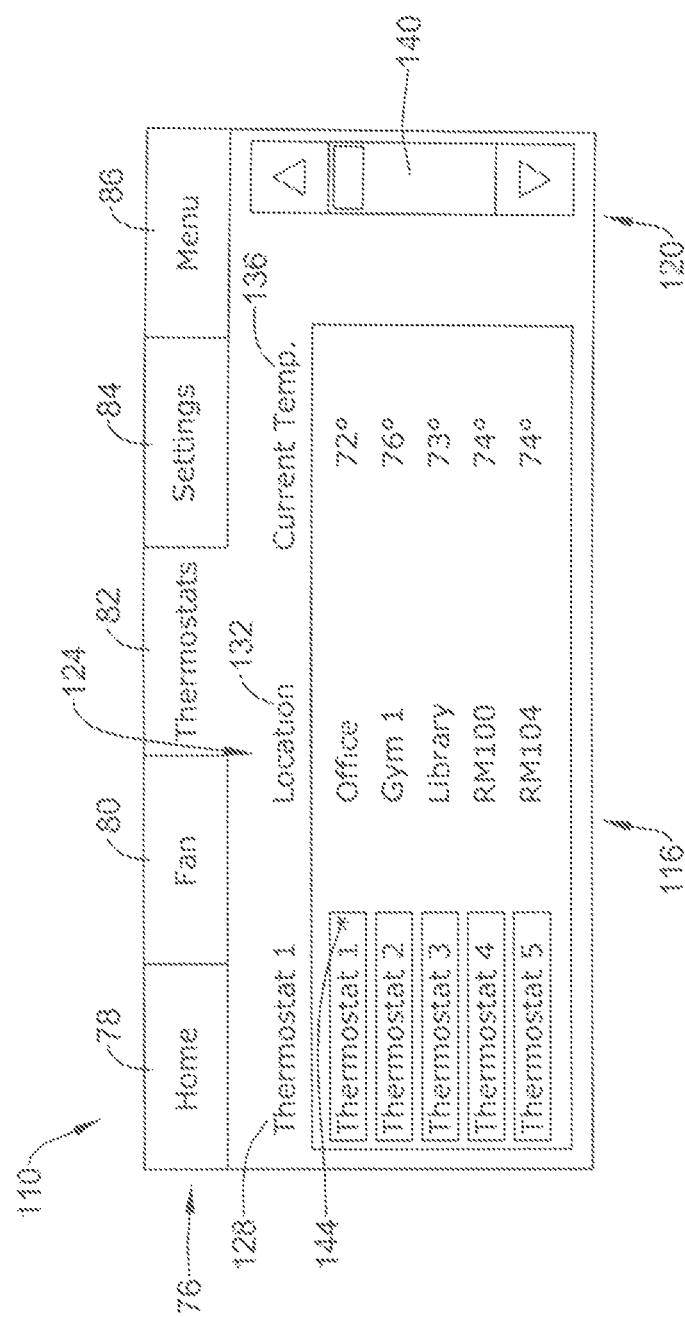

In some instances, information regarding one or more remote HVAC controllers 28 (e.g. thermostats) located in the same building and/or on the same network may be accessed by selecting the appropriate button, icon or tab provided, for example along the navigational bar 76. For example, as shown in FIG. 7, the user may access a list of available thermostats located in the building and/or on the same communication network by selecting the THERMOSTATS button 82 provided along the navigational bar 76. Selecting the THERMOSTATS button 82 may result in a thermostats screen 110 being displayed on the display 62, as shown in FIG. 7. The thermostats screen 110 may be configured to display a list of available thermostats located in the same building and/or on the same communication network. In some cases, the thermostats screen 110 may include additional information such as the location of each thermostat and a current temperature associated with each of the thermostats, but this is not required. In some cases, the THERMOSTATS button 82 may be accessed from any screen displayed by the local thermostat (via the navigational bar 76), and may be used to return to the list of available thermostats on the communication network from which the user may select a different thermostat for viewing and/or manipulation.

In some instances, the thermostats screen 110 may include a first region 116 and a second region 120. The first region 116 may be configured to display a table 124 that provides a list of available thermostats located in the same building and/or that connected to the same communication network. In some cases, the table 124 may provide the location of each thermostat, and a current temperature associated with each of the thermostats. Depending upon how much information the table 124 is configured to contain, the table 124 may be a scrollable table, but this is not required. In some cases, the table 124 may include at least one column and at least one row of information. In the example shown, the available thermostats, including the local thermostat that is displaying the thermostat screen 110, are listed in a first column 128 labeled "THERMOSTAT." The second column 132 of the illustrative table 124, labeled "LOCATION", may provide the location for each of the listed thermostats. The third column 136, labeled "CURRENT TEMP", may display the current sensed temperature for each of the listed thermostats. It is contemplated that the table 124 can be configured to contain a different number of columns and/or rows containing different information about the various thermostats, as desired. In some cases, the second region 120 may include a scroll bar or sliding bar 140 that permits the user to move up and/or down within the table 124 to view information regarding additional thermostats, if present. For example, a user may use the scroll bar 140 to view information about a desired thermostat that may be on the communication network, and that is not currently visible on thermostats screen 110.

In some instances, table 124 may include a visual indicator 144 indicating which thermostat is the local thermostat (e.g. currently displaying the thermostats screen 110). The terms "local thermostat", "current thermostat", instant thermostat", "first thermostat" or "main thermostat," may be used to refer to the thermostat that is currently employed by a user to access and/or communicate with at least one remote thermostat via the communication network 30. The local thermostat is typically at the same location as the user, and is currently being manually manipulated by the user. In some instances, the table 124 may be configured to display a marker such as a diamond, asterisk, or other shape next to the name of the local thermostat. In other cases, the visual indicator may include highlighting to indicate the local thermostat. Exemplary highlighting techniques include shading, bolding, bolded outlines, dotted outlines, and the like. It is to be understood that more than a combination of visual indicators may be used to visually indicate the local thermostat. As shown in FIG. 7, THERMOSTAT 1 is identified by a diamond 144, indicating that it is the local thermostat that is currently being used to access and/or manipulate settings on one or more remote thermostats. The names and locations of the remote thermostats are also shown in illustrative table 124. The current sensed temperature from each of the remote thermostats is also displayed.

Figure 8:
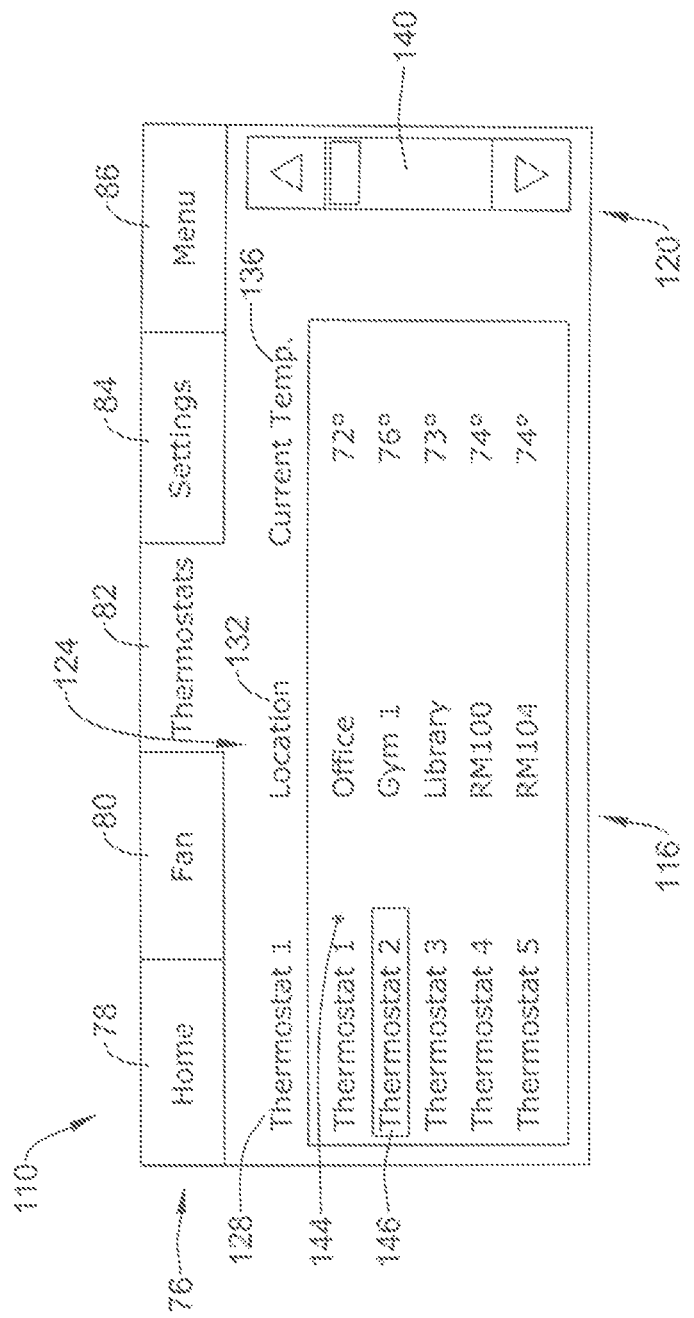

In the example shown, a user may select a thermostat from the list of thermostats provided in table 124 to make a change to a least one parameter setting of the selected thermostat. For example, as shown in FIG. 8, THERMOSTAT 2, located in GYM 1, has been selected. A visual indicator 146, such as a visual marker and/or highlighting may be used to indicate the selected thermostat. In some cases, the visual indicator 146 used to indicate the selected thermostat may be different from the visual indicator 144 used to identify the local thermostat, but this need not be always the case. As shown in FIG. 8, a bolded outline has been used to indicate that THERMOSTAT 2 has been selected.

Figure 9:
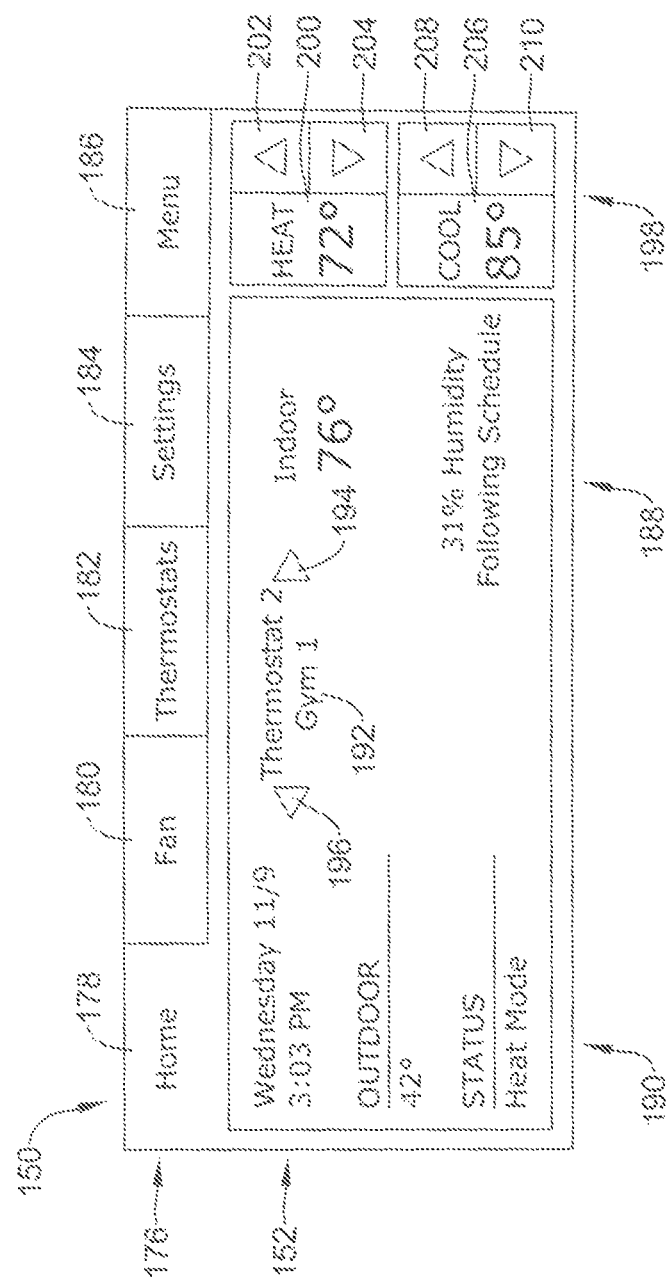

In some cases, selection of a thermostat (e.g. THERMOSTAT 2) from the list of available thermostats may cause the controller to automatically display one or more screens such as, for example, HOME screen 150 on the display 152 of the local thermostat. Selection of a thermostat from the list of available thermostats may cause the local thermostat's controller (e.g., processor 44 of FIG. 4) to access THERMOSTAT 2 over the communication network, and to display one or more screens from THERMOSTAT 2 such as for example HOME screen 150, on the display 152 of the local thermostat, as shown in FIG. 9. In other cases, after selecting a thermostat (e.g., THERMOSTAT 2) from the list of available thermostats for which a parameter change is desired, the user may select the HOME button 78 provided along navigation bar 76. Selecting the HOME button 78 may cause the local thermostat's controller (e.g., processor 44 of FIG. 4) to access THERMOSTAT 2 over the communication network, and to display one or more screens from THERMOSTAT 2 such as for example HOME screen 150, on the display 152 of the local thermostat, as shown in FIG. 9. In some cases, selection of the HOME button 78 by a user may also cause the controller to display the HOME screen 72 from of the local thermostat (e.g., THERMOSTAT 1). For example, in some cases, selecting the HOME button 78 again once the HOME screen 150 of the remote thermostat (e.g., THERMOSTAT 2) has been displayed may cause the controller to return to displaying the home screen of the local thermostat (e.g., HOME screen 72 of THERMOSTAT 1).

Display of one or more screens from the remote thermostat may be accomplished by, for example, executing a remote access application or function on the local thermostat, which may facilitate the local thermostat to gain access to remote THERMOSTAT 2 across the communication network. As part of this feature, the local thermostat may be configured to display one or more screens, including HOME screen 150 on the display 152, with information that corresponds to THERMOSTAT 2 rather than the local thermostat. The screen(s) that include information that correspond to THERMOSTAT 2 may be the same or substantially similar to the screen(s) that would be viewed by a user if the user were physically at the user interface of THERMOSTAT 2. Additionally, depending upon the user's login credentials and/or permitted levels of access, the local thermostat may permit the user to change at least one parameter setting for THERMOSTAT 2, through the screen(s) that are displayed on the user interface of the local thermostat. The parameter setting may include, for example, a temperature set point, a scheduling parameter, an installer setting, or any other suitable parameter or setting, as desired. In some cases, the local thermostat may permit the user to change at least one installer configuration of the remote thermostat (e.g. THERMOSTAT 2) through the user interface of the local thermostat (e.g. THERMOSTAT 1). Additionally, in some cases, the remote thermostat (e.g. THERMOSTAT 2) that is being accessed by another thermostat across the communications network may be configured to display a visual indicator on the display indicating to a user that it is being remotely accessed. In some cases, the visual indicator may indicate the location and/or thermostat from which the remote thermostat (e.g. THERMOSTAT 2) is being accessed.

As shown in FIG. 9, HOME screen 150 that includes information for THERMOSTAT 2 may include many of the same features displayed by HOME screen 72 for THERMOSTAT 1 shown in FIG. 6. For example, HOME screen 150 may include navigational menu bar 176 which may be considered as providing top level navigation, but this is not required. In some cases, if desired, navigational menu bar 176 may include one or more of a HOME button 178, a FAN button 180, a THERMOSTATS button 182, a SETTINGS button 184, and/or a MENU button 186.

In some cases, home screen 150 may be considered as having two or more regions. For example, home screen 150 may include a first region 188 and a second region 190. In some instances, first region 188 may be considered as displaying or otherwise providing primary information while second region 190 may be considered as displaying or otherwise providing secondary information. In some cases, primary information may be information that is considered to be more important, more interesting and/or more useful than secondary information. To illustrate, first region 188 may display one or more of a current temperature reading, a current indoor humidity, a schedule status, and the like.

In some cases, as discussed above, the first region 188 may display a thermostat identifier 192, identifying the particularly thermostat from which the information is currently displayed and, in some cases, the building location of the particular thermostat. In some instances, the thermostat identifier 192 may include the thermostat name and/or building location of the thermostat from which the information is currently displayed. For example, as shown in FIG. 9, the thermostat identifier 192 may indicate to the user that the thermostat from which the information is currently being displayed corresponds to THERMOSTAT 2, and that its location is GYM 1. Alternatively, it is contemplated that the thermostat may be simply identified by its building location.

For example, the thermostat identifier 192 may simply state "OFFICE" or "GYM 1", rather than provide an additional identifier such as "THERMOSTAT 1" or THERMOSTAT 2." In yet other cases, the thermostat identifier 192 may include a building icon, which may show the location of the thermostat on an outline or map of the building. In some cases, if the information that is displayed is from the local thermostat, the thermostat identifier 192 may include a label such as "THIS DEVICE", "LOCAL DEVICE", "CURRENT DEVICE" or "ACTIVE DEVICE" to indicate to the user that the information that is currently displayed is from the local thermostat. The labels "THIS DEVICE", "LOCAL DEVICE", "CURRENT DEVICE" or "ACTIVE DEVICE" may be used in conjunction with other identifiers or labels to identify the various thermostats on the communication network 30, if desired.

In some instances, the thermostat identifier 192 may include a forward arrow 194 and/or a back arrow 196, which may be used to navigate between the various available thermostats on the network. For example, selecting back arrow 196 may return the user to home screen 72 associated with THERMOSTAT 1 (see FIG. 6). Selecting forward arrow 194 may display a home screen associated with a THERMOSTAT 3, which may be located in yet another region of the building (e.g., library), as indicated on the list of available thermostats provided in FIGS. 7 and 8. Home screen 150 may also include a third region 198 that may be used for displaying and/or adjusting a parameter value such as a parameter that is displayed within first region 188 of home screen 150. In some cases, for example, third region 198 may, as illustrated, display both a heating temperature set point and a cooling temperature set point, but this is not required. Third region 198 may include a first parameter 200, a first up arrow 202 and a first down arrow 204. Third region 198 may also include a second parameter 206, a second up arrow 208 and a second down arrow 210. In the example shown, first parameter 200 for the selected thermostat may be adjusted up or down by using first up arrow 202 and/or first down arrow 204, as appropriate. Similarly, second parameter 206 for the selected thermostat may be adjusted up or down using second up arrow 208 and/or second down arrow 210, as appropriate.

Figure 10:
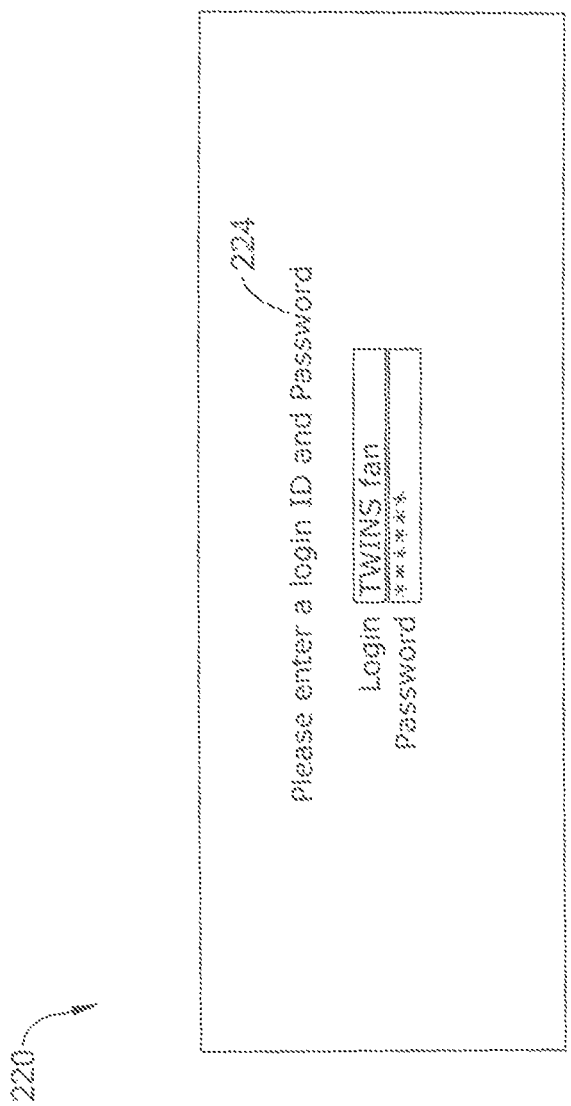

In some instances, when a user attempts to adjust a parameter setting such as, for example, a heating temperature set point or a cooling temperature set point using arrows 202, 204, 208, and/or 210, for a remote thermostat on the communication network, the local thermostat may be configured to display a login prompt screen 220, as illustrated in FIG. 10. The login prompt screen 220 may include a user prompt 224 which may prompt the user to enter a login ID or user ID and/or password. In some cases, certain user rights may be assigned to a select login ID/password combination. Depending upon the user's login credentials, the user may be granted different level of access and/or control over all thermostats, a group of thermostats, or only one or two thermostats on the communication network. For example, in some cases, depending upon the user's login credentials, the user may be given full access and/or control over all thermostats on the communication network, partial access and/or control over all thermostats on the network, full access and/or control over a select group of thermostats, partial access and/or control over a select group of thermostats, and the like. In some cases, the user's login credentials may permit the user to only view the settings from remote thermostats, but not to make changes. In the example shown, once the user has entered there user ID and password, the local thermostat may be configured to display the previous screen such as, for example, home screen 150 shown in FIG. 9.

Depending upon the user's level of access, the user may then proceed to change at least one parameter setting for the thermostat that is identified on the home screen 150. For example, and with reference to FIG. 9, the user may user arrow keys 202 or 204 to increase or decrease a heating temperature set point for THERMOSTAT 2 located in GYM 1. If a scheduling parameter change is desired, the user may select the SETTINGS button 184 provided in the navigational menu bar 176 to access a settings screen 230, such as shown in FIG. 11.

Figure 11:
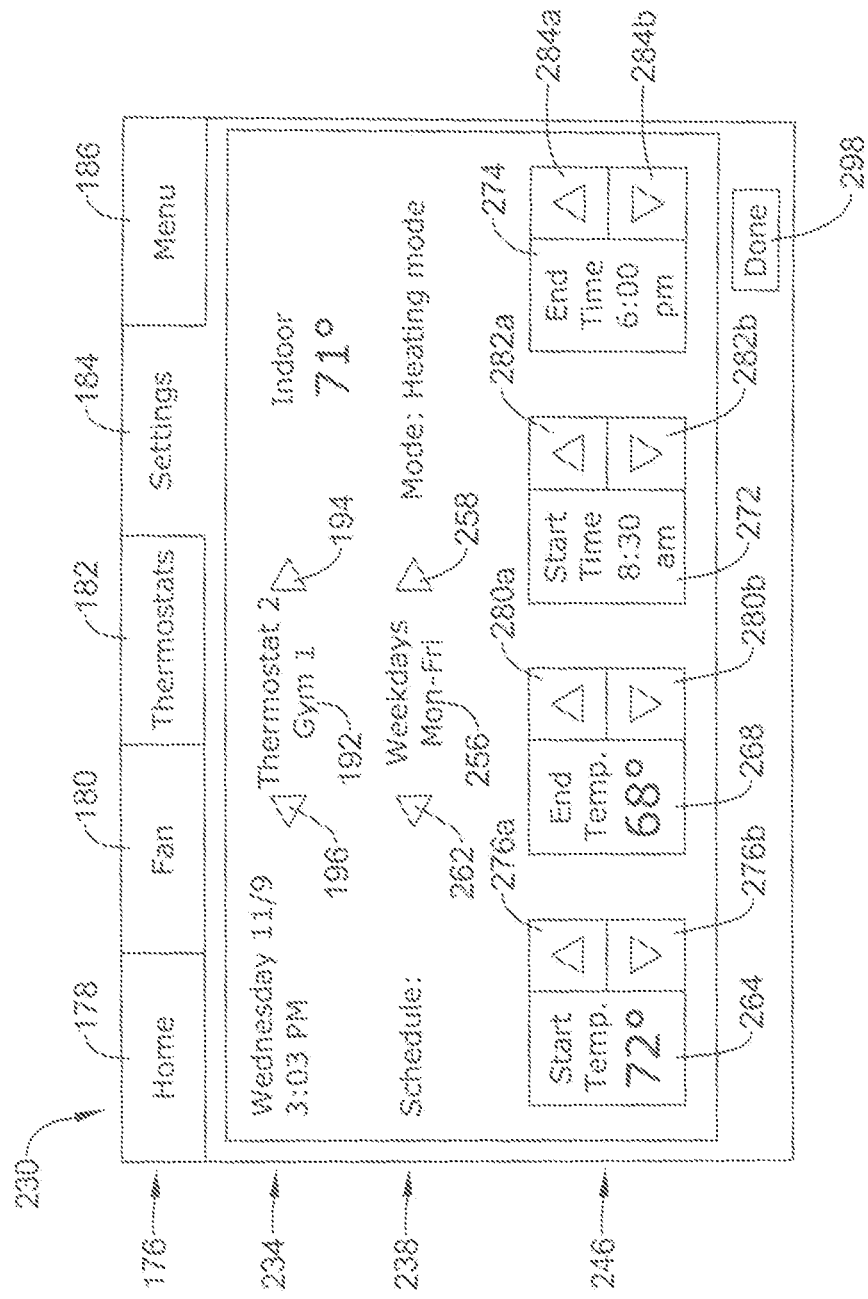

As shown in FIG. 11, the illustrative settings screen 230 may include one or more parameters pertaining to a schedule which the thermostat (e.g., THERMOSTAT 2) may be programmed to follow. The settings screen 230 may include one or more regions. For example, the settings screen 230 may include a first region 234 which includes at least the thermostat identifier 192 identifying the selected thermostat that is currently accessed by the user. The first region 234 may also include the current date and/or time, and the current temperature sensed by the selected thermostat. In some instances, the settings screen 230 may also include a second region 238 identifying the schedule according to which the selected thermostat is currently operating, and a third region 246 displaying the currently active schedule parameters of the identified schedule.

Figure 12:
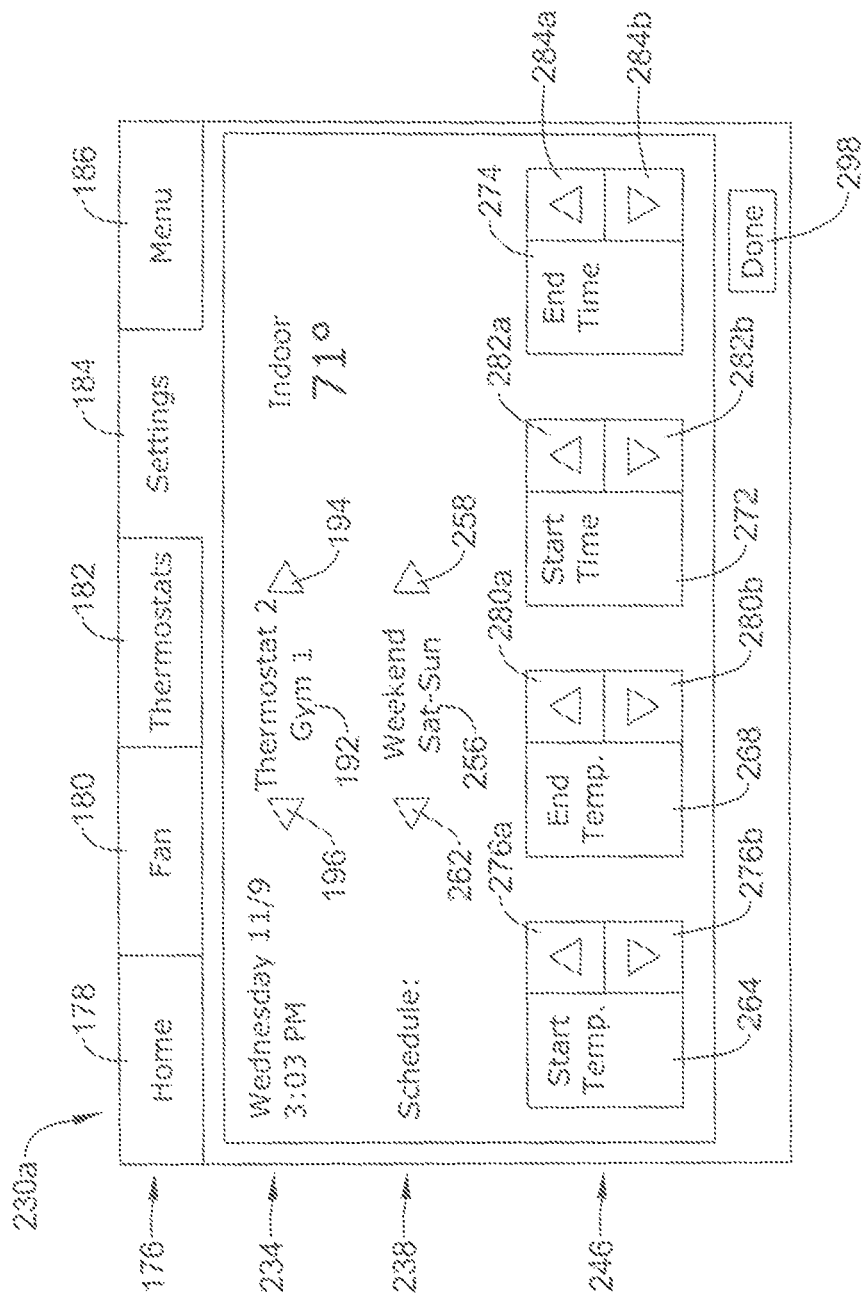
Figure 13:
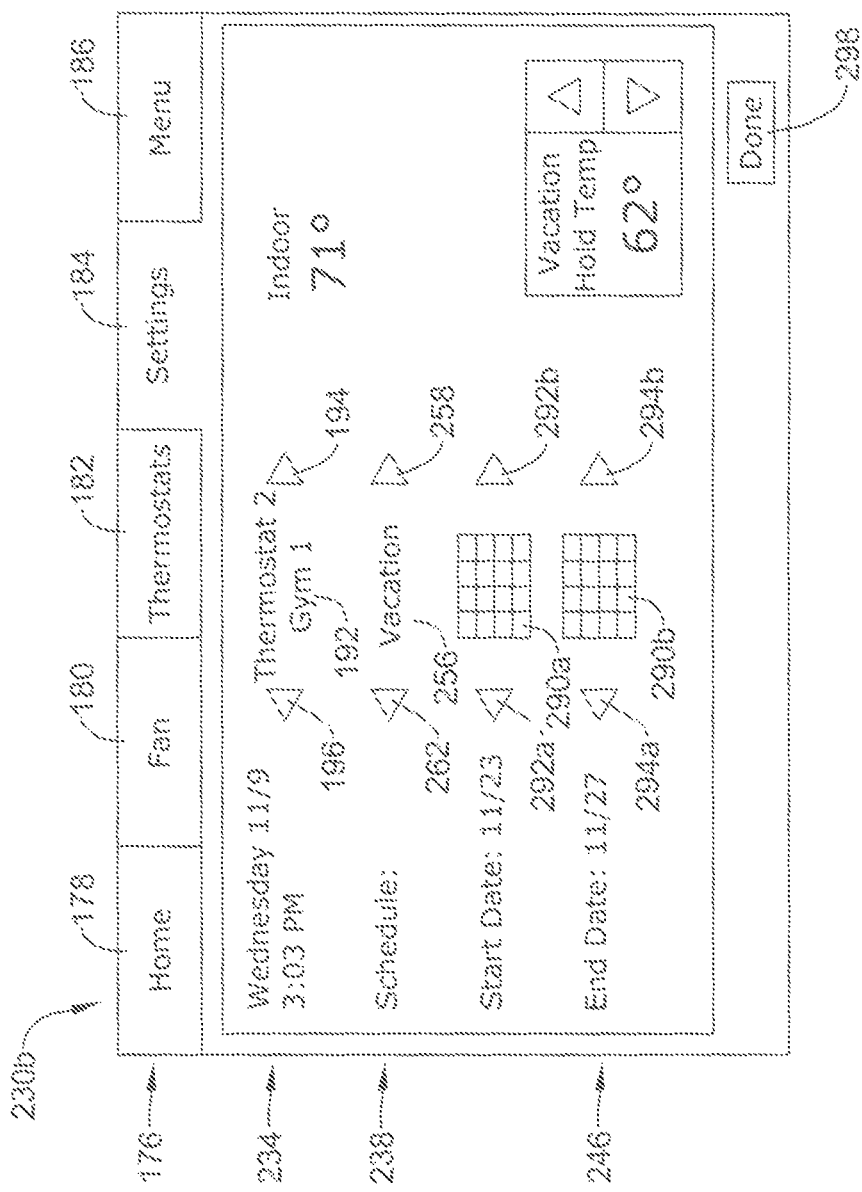

In some cases, the second region 238 may include a schedule identifying label 256 identifying the current schedule. For example, as shown in FIG. 11, the current schedule may be a "Weekdays" schedule, pertaining to Monday-Friday. The label 256 may also include a forward arrow 258 and/or back arrow 262, which may facilitate navigation between multiple schedules. For example, forward and/or back arrows 258, 262 may be used to display a "Weekend" schedule as shown in FIG. 12 or "Vacation" schedule as shown in FIG. 13. Returning to FIG. 11, at least one scheduling parameter associated with the "Weekday" schedule for the selected thermostat "THERMOSTAT 2" may be changed through the setting screen 230. As shown in FIG. 11, the third region 246 may include a start temperature 264, an end temperature 268, a start time 272 and/or an end time 274 associated with the "Weekday" schedule identified in the second region 238. Associated with each of the start temperature 264, end temperature 268, start time 272, and/or end time 274 may be first and second arrow keys 276a, 276b, 280a, 280b, 282a, 282b, 284a and 284b for increasing and/or decreasing the selected parameter. For example arrow keys 276a, 276b may be used to increase/decrease the start temperature. The "Weekend" schedule shown in FIG. 12 and the "Vacation" schedule shown in FIG. 13 may be manipulated in similar manner.

In addition, in some cases such as illustrated in FIG. 13, the settings screen 230b showing the "Vacation" schedule may include a calendar for setting the date range in the third region 246 of the screen 230b. For example, as shown in FIG. 13, the third region 246 of the "Vacation" schedule may include a first calendar icon 290a for setting the start date and a second calendar icon 290b for setting the end date of the "Vacation" schedule. Each of the first and second calendar icons 290a, 290b may include first and second arrows 292a, 292b, 294a, and 294b for advancing the calendar to the desired month in a select calendar year.

Once the user is finished making changes to one or more of the schedules, the user may select the "DONE" button 298 displayed on any one of the settings screens 230, 230a, or 230b, to indicate that they have completed making changes to the settings. Once the user has selected the "DONE" button 298, the local thermostat may temporarily display illustrative screen 302, which is shown in FIG. 14. In screen 302, the local thermostat may display a message informing the user that the local and/or remote thermostats are saving the changes that the user has just made. After which, the local thermostat may return to displaying a HOME screen such as, for example, illustrative HOME screen 150 as shown in FIG. 9.

As indicated above, when the HOME button 178 has been selected, "home" screens for remote thermostats on the communication network may be accessed and/or viewed by pressing the forward and/or backward arrow keys 194, 196 associated with the thermostat identifier 192. The scheduling parameters may be then accessed from the corresponding "home" screen for the selected remote thermostat by selecting the SETTINGS button 184 provided along the navigational menu bar 176. In other cases, once the user has accessed the "settings" screen 230 as shown in FIG. 11 for a select thermostat by selecting the SETTINGS button 184, arrow keys 194, 196 associated with the thermostat identifier 192 may be used to navigate to and view the "settings" screen for additional thermostats located on the network.

Figure 15:
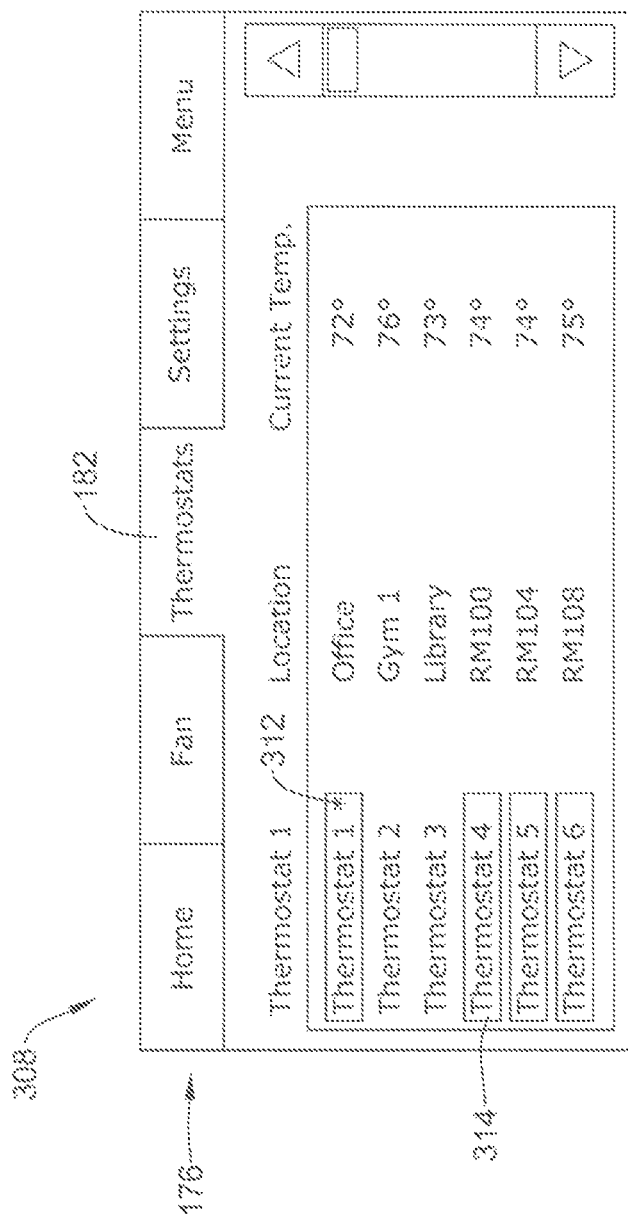

In some cases, it is contemplated that at least one parameter setting may be changed for multiple thermostats on the communication network at the same time. The parameter setting may be a temperature set point, a scheduling parameter, an installer configuration or setting, or any other suitable parameter or setting, as desired. This may be accomplished by, for example, selecting multiple thermostats from the list of available thermostats displayed on the illustrative "thermostats" screen 308 of FIG. 15. In the illustrative embodiment of FIG. 15, two or more of the available thermostats may be selected by touching the name(s) associated with the desired thermostat(s). In some instances, a first marker 312 such as a diamond, asterisk, or other shape may be provided next to the name of the local thermostat. As shown in FIG. 15, THERMOSTAT 1 is identified by a diamond 312, indicating that it is the local thermostat that is currently being used by the user. A second marker 314 may be used to identify the thermostats that are selected by the user. The second marker 314 may include at least one other visual indicator that is different than the visual indicator used to identify the current thermostat. Exemplary highlighting techniques include shading, bolding, bolded outlines, dotted outlines, and the like.

Figure 16:
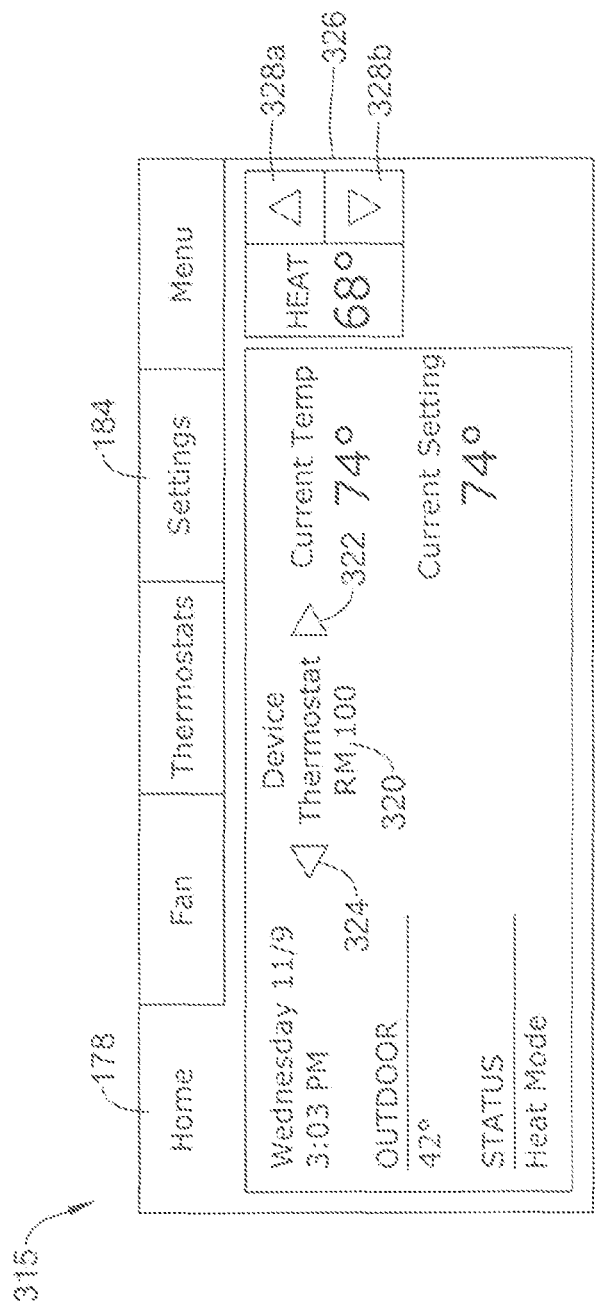

After one, two or more of the thermostat(s) have been selected by the user, the user may select either the HOME button 178 or the SETTINGS button 184 provided along the navigational menu bar 176 of the local thermostat. FIG. 16 is an illustrative home screen 315 that may be displayed after the HOME button 178 has been selected. Home screen 315 may appear similar to illustrative home screen 150 as shown in FIG. 9 and may include many of the same features. In many cases, home screen 315 may include a thermostat identifier 320 identifying the thermostat for which the changes are being made. Additionally, the thermostat identifier 320 may include forward and/or back arrows 322, 324 for navigating back and forth between the selected thermostats.

In some cases, a temperature set point for each of the selected thermostats may be changed through home screen 315. For example, as shown in illustrative FIG. 16, home screen 315 may display a heating temperature set point in one region 326 of home screen 315. Additionally region 326 may include up and down arrow keys 328a, 328b for increasing and/or decreasing the heating temperature set point. After the user has increased or decreased the temperature set point, the local thermostat may then display illustrative screen 334 shown in FIG. 17. In screen 334, the local thermostat may display at least one question, asking the user if the change should be applied to all selected thermostats. YES and NO buttons 336, 338 are provided to enable the user to answer the question. In addition, screen 334 may include a BACK button 340 which may return the user to the previous screen, and a HELP button 342 that when selected may provide additional information to the user to assist the user in making the choice.

If the YES button 336 is selected, then the local thermostat may display a screen such as screen 348 shown in FIG. 18. Screen 348 may display a message that the temperature set point (or other parameter setting) has been changed for all selected thermostats. Screen 348 may also include a BACK button 340, which when selected, may be used to return the user to the HOME screen 315 as shown in FIG. 16. The user may use the arrow keys 322, 324 associated with the thermostat identifier 320 on the home screen 315 to view the individual home screens 352, 356 (FIGS. 19 and 20) for each of the selected thermostats to confirm that the parameter setting change has been in fact made for each of the selected thermostats.

Figure 21:
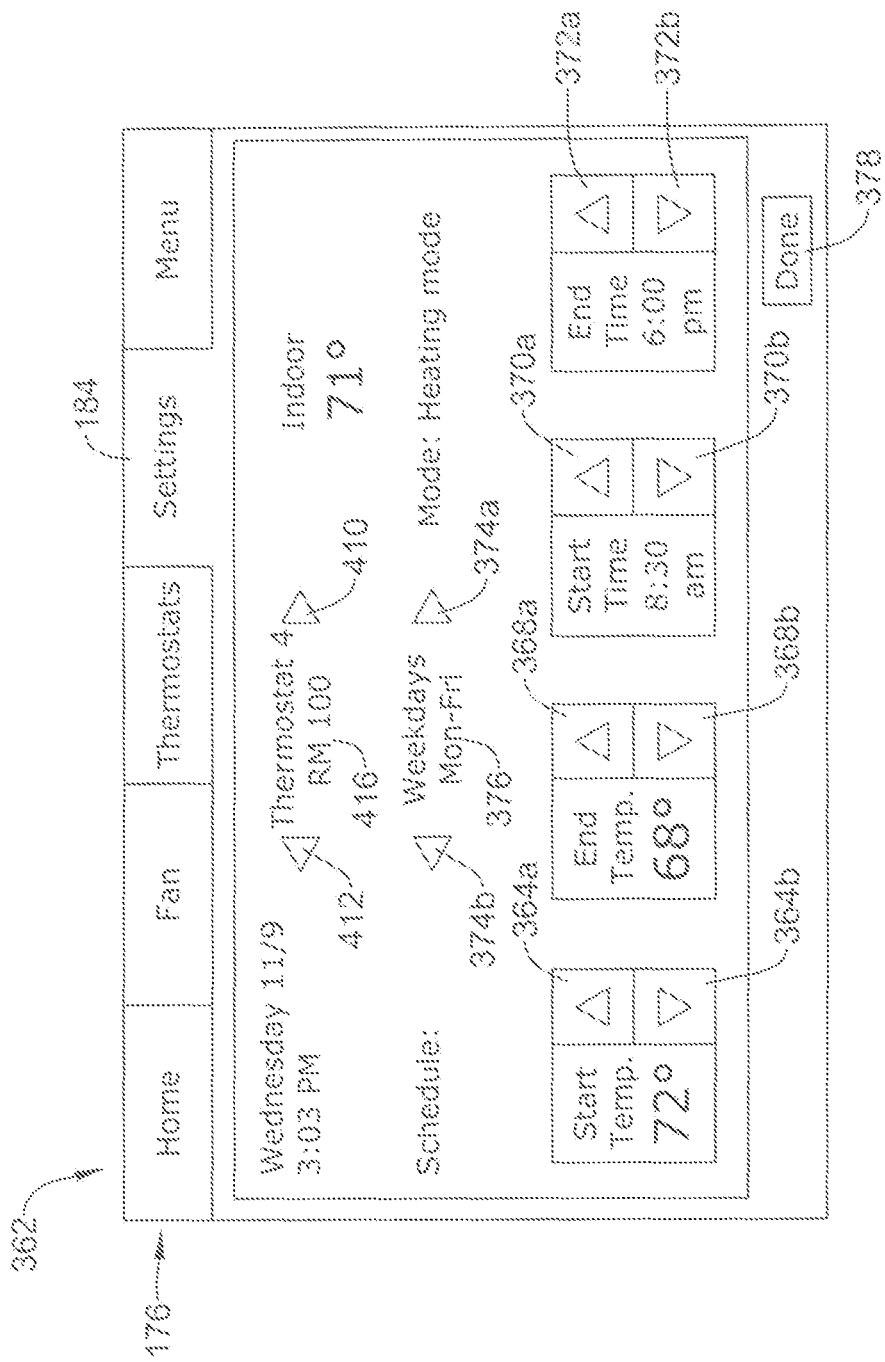

In some cases, such as when a scheduling parameter change is desired or necessary for two or more thermostats, the user may first select the desired thermostats from the list of available thermostats, such as shown in FIG. 15, and then select the SETTINGS button 184 provided along the navigational menu bar 176. Pressing the SETTINGS button 184 may cause the local thermostat to display a settings screen 362, such as shown in FIG. 21, for the first thermostat selected on the list. The first thermostat may be the local thermostat, but this is not required. Settings screen 362 may include many of the same features as settings screen 230 shown in FIG. 11.

The user may use the up and/or down arrows 364a, 364b, 368a, 368b, 370a, 370b, 372a and/or 372b to make at least one scheduling parameter change to the schedule that is displayed. In some cases, the user may use the forward and/or back arrow keys 374a, 374b associated with the schedule identifier 376 to view and/or make changes to additional scheduling parameters associated with additional schedules.

Figure 22:
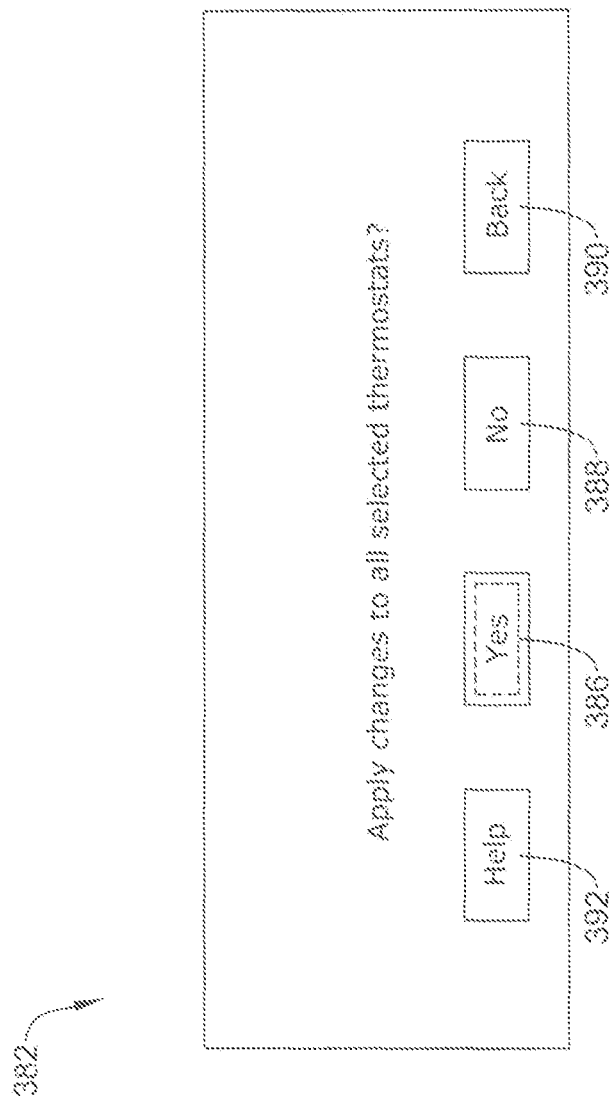

Once the user is finished making desired changes to one or more of the schedules, the user may select the DONE button 378 to indicate that they have completed making changes. Once the user has selected the DONE button 378, the local thermostat may display illustrative screen 382, which is shown in FIG. 22. Illustrative screen 382 may display at least one question, asking the user if the change should be applied to all selected thermostats. YES and NO buttons 386, 388 are provided to enable the user to answer the question. In addition, screen 382 may include a BACK button 390, which may return the user to the previous screen, and a HELP button 392 that when selected may provide additional information to the user to assist the user in making the choice.

Figure 23:
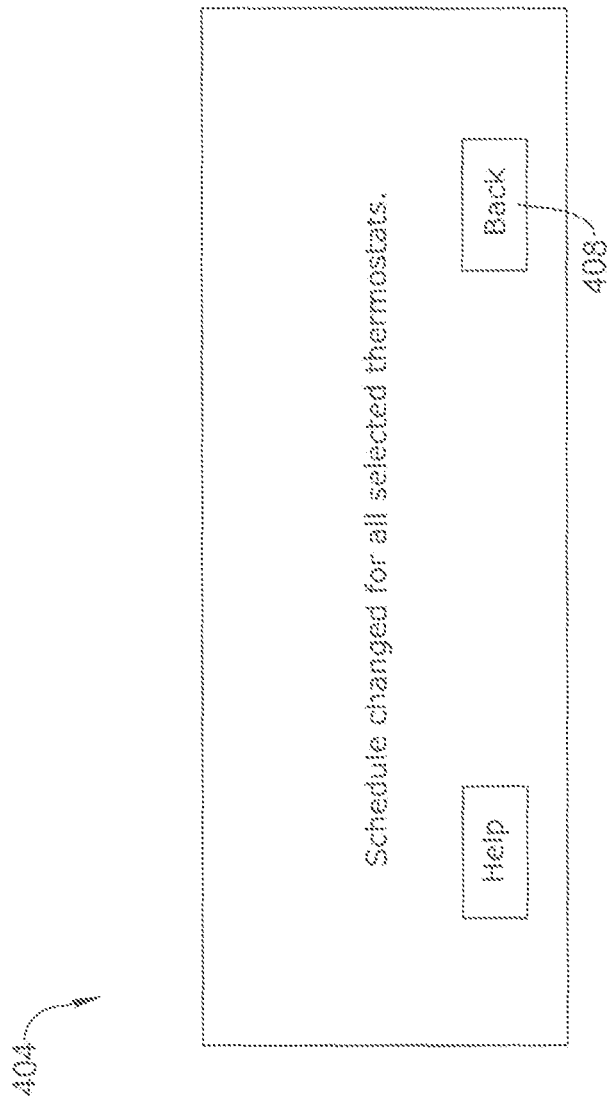

If the YES button 386 is selected, the local thermostat may temporarily display screen 404, which is shown in FIG. 23. Screen 404 may display a message that the schedule has been changed for all selected thermostats. Screen 404 may also include a BACK button 408 that when selected may be used to return the user to the HOME screen 315, as shown in FIG. 16. To confirm that the schedule change has been made to all selected thermostats, the user may first select the SETTINGS button 184 to first display the settings screen 362 as shown in FIG. 21. The user may then use the arrow keys 410, 412 associated with the thermostat identifier 416 on the settings screen 362 (FIG. 21) to view the individual settings screens for each of the selected thermostats to confirm that the schedule changes have been in fact made for each of the selected thermostats.

Figure 24:
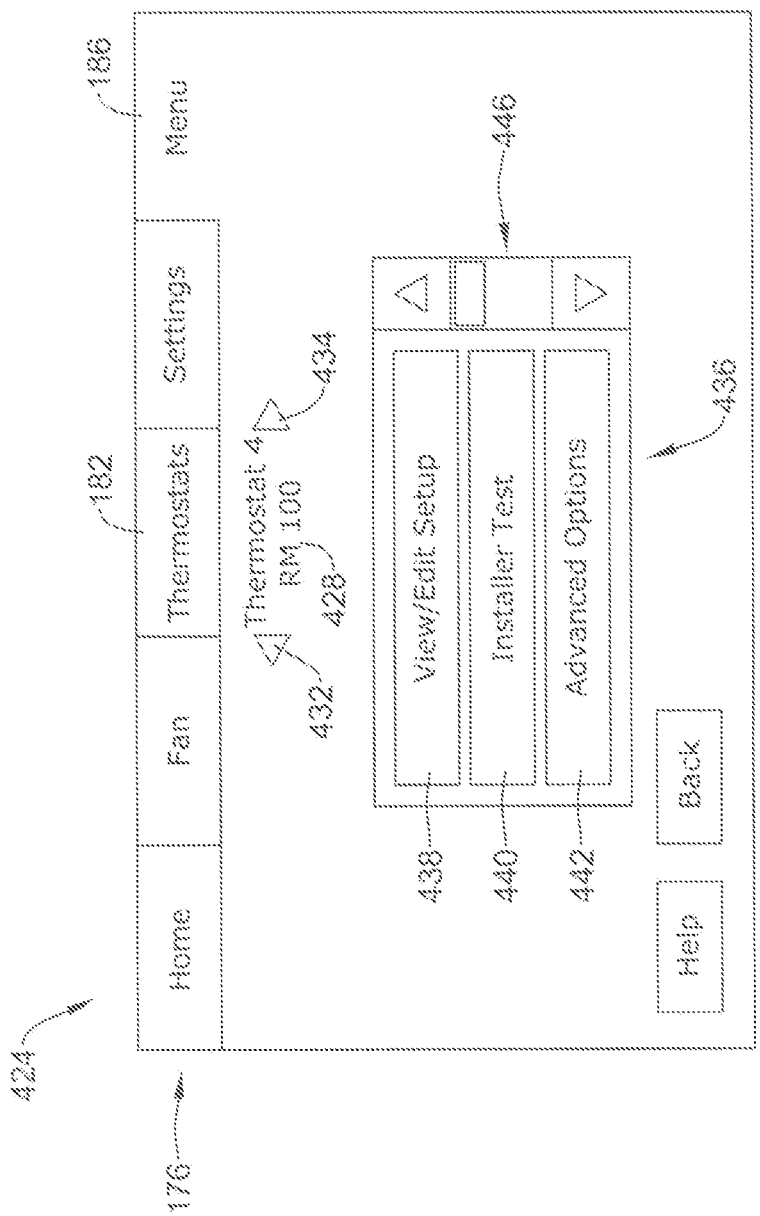

In some cases, the local thermostat also may be used to make at least one change to an installer configuration of at least one remote thermostat on the communication network 30. Menu options relating to an installer configuration may be accessed by, for example, pressing the MENU button 186 provided along the navigational menu bar 176 of any of the illustrative screens shown in the previous figures. Once the MENU button 186 has been selected, the local thermostat may display a menu options screen 424 such as shown in FIG. 24.

The illustrative menu options screen 424, like some of the other screens, may include a thermostat identifier 428 identifying the selected thermostat currently being accessed by the user. For example, as shown in FIG. 24, the thermostat identifier 428 currently identifies THERMOSTAT 4, located in room 100 of the building, as being selected and currently accessed by the local thermostat. In some cases, first and second arrows 432, 434 are associated with the thermostat identifier 428 and may be used to navigate between other thermostats that are available for access through the menu options screen 424 over the communication network 30. In some cases, the menu options screen 424 may include a table 436 listing different menu options 438, 440, 442. In some cases, the table 436 may be a scrollable table in which case the installer menu options screen may also include a scroll bar 446 for scrolling up and down through the various different available menu options.

Figure 25:
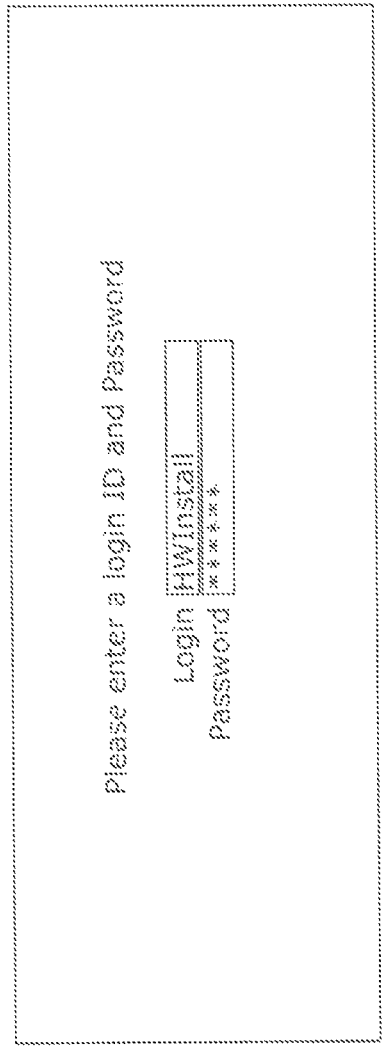

In the illustrative example, upon selection of the "View/Edit Current Set UP" menu option 438 provided in table 436, the local thermostat may display a screen such as, for example, screen 452 of FIG. 25, prompting the user to enter their login credentials. As discussed previously, different user rights may be assigned to different login credentials. For example, an installer or dealer may have a different login and password which may give them full or more access and control over all or more of the thermostats on the communication network. For example, the installer may be able to change installer configuration for at least one thermostat on the communication network 30, where another use may not.

Figure 26:
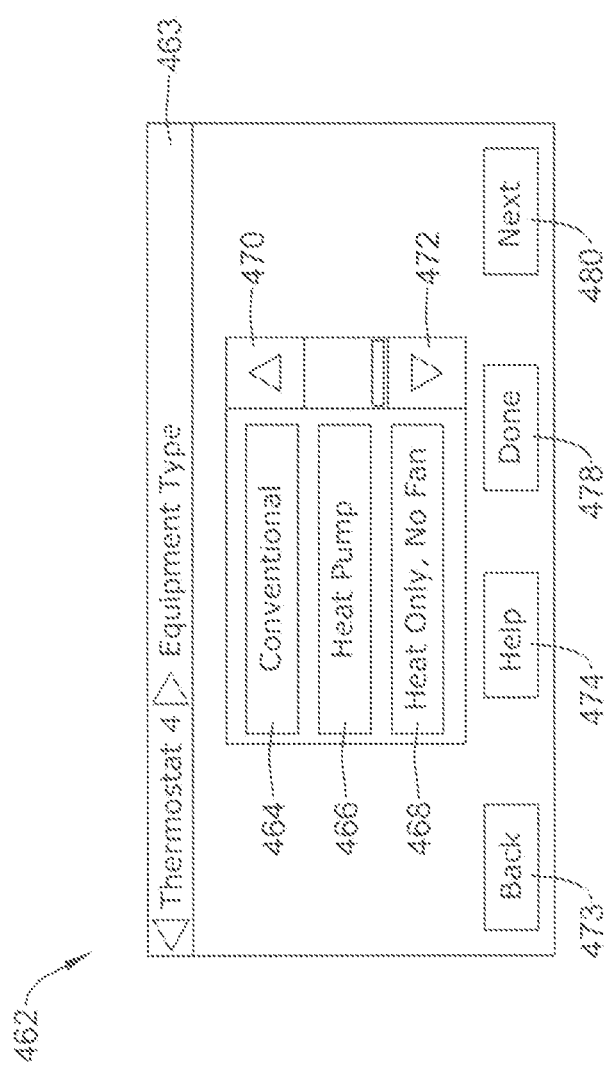
Figure 27:
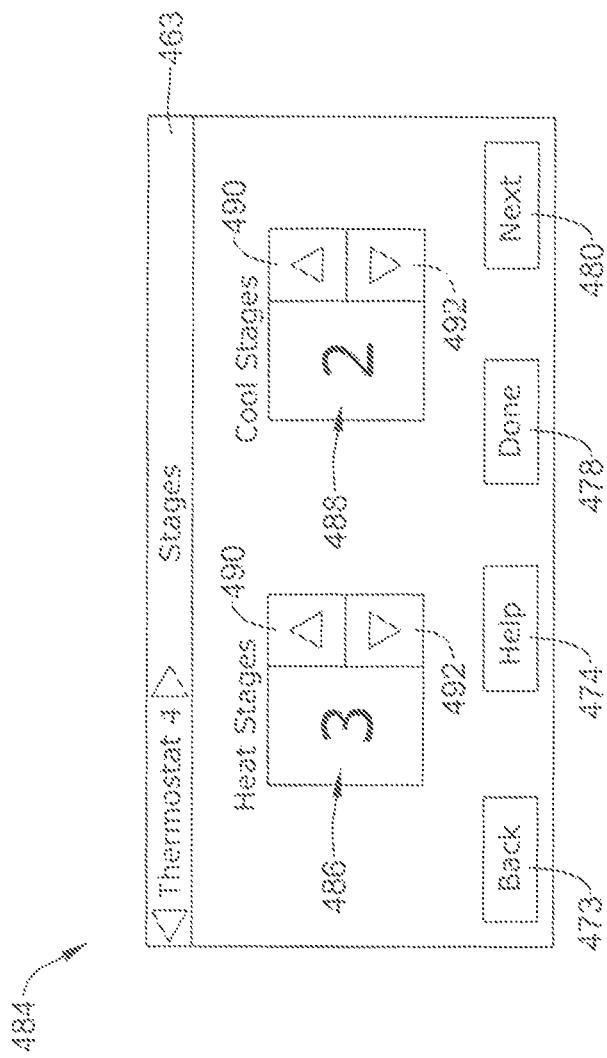

After the user enters the appropriate login credentials, the local thermostat may display a number of different screens related to the installer set up. These screens may allow an installer to view and/or edit one or more set up parameters relating to the HVAC unit with which the selected thermostat controls. FIGS. 26-27 show examples of screens that may be displayed by the local thermostat during an installer configuration change or set up. Depending upon the particular HVAC equipment that will be controlled by the selected thermostat(s), more or fewer screens may be displayed depending upon the circumstances.

As illustrated, upon selecting the "View/Edit Current Set Up" menu option 438, the local thermostat may display screen 462 of FIG. 26. Screen 462 may be used by the installer to specify the equipment type to be controlled by the selected thermostat(s). In some cases, screen 462 may include one or more of a CONVENTIONAL button 464, a HEAT PUMP button 466 and a HEAT ONLY, NO FAN button 468. Screen 462 may also include a banner 463 including a thermostat identifier and a menu location which may be useful to the installer in identifying which parameter is being changed and for which thermostat. While only three equipment buttons are shown, it will be appreciated that in some instances, there may be more equipment buttons than can be displayed at one time. Screen 462 may include an up button 470 and a down button 472 that can be used to scroll up and/or down through the various equipment buttons.

Figure 19:
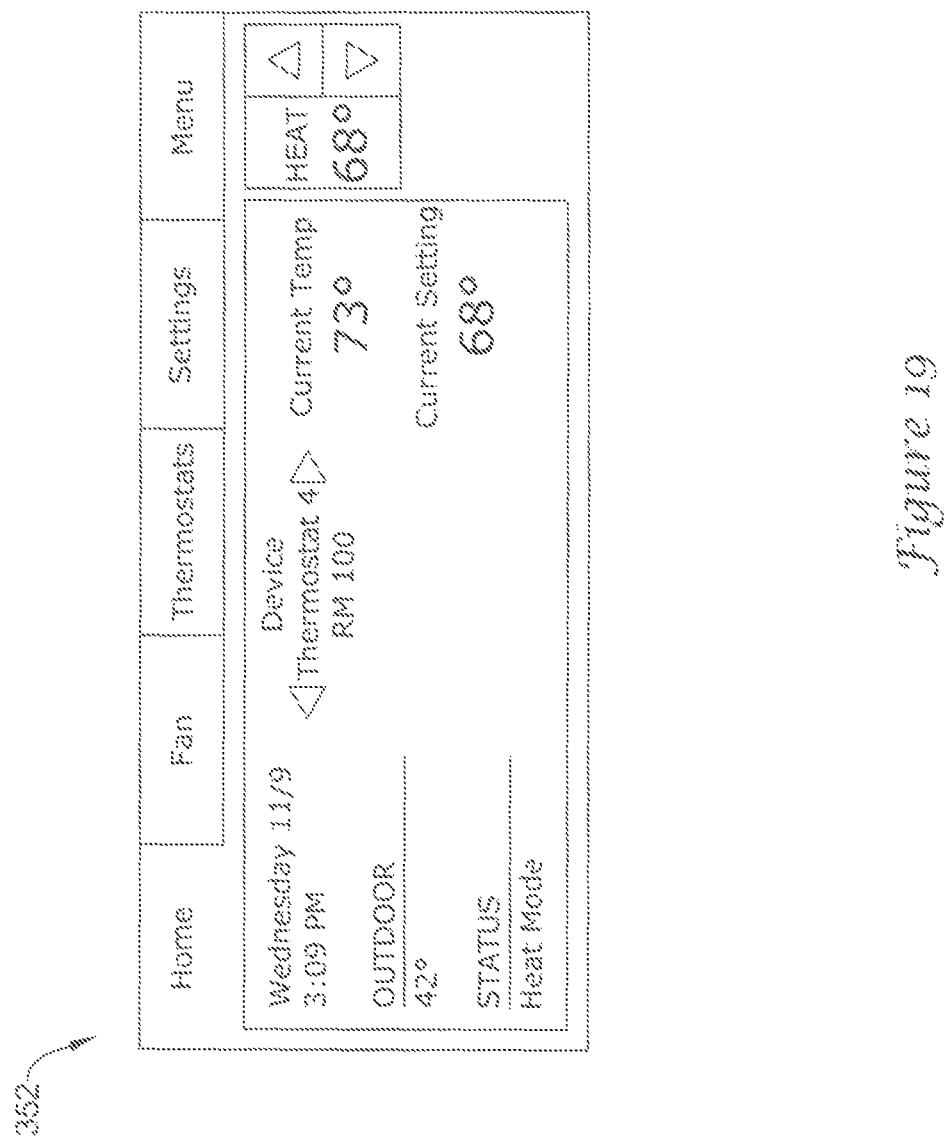
Figure 20:
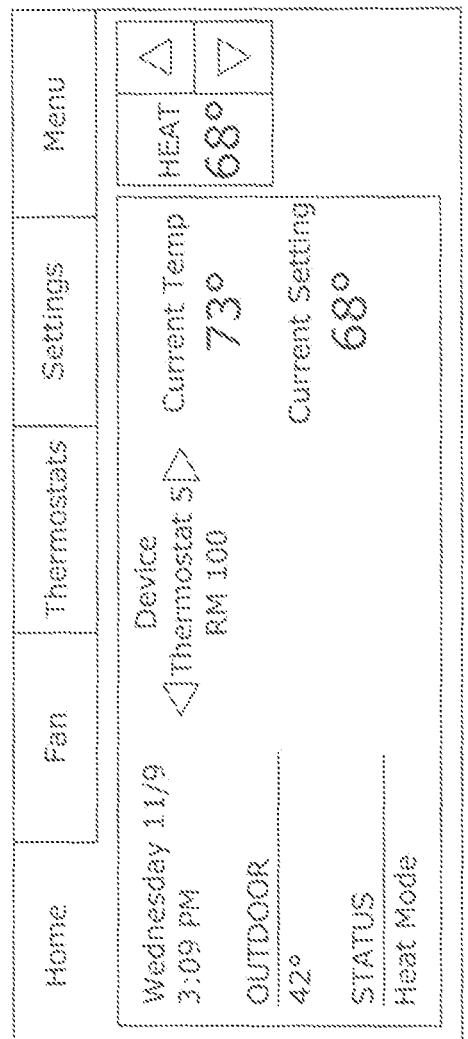

In some cases, screen 462 may include BACK button 473 which may permit the installer to revert to a previous screen, while HELP button 474 may provide the installer with additional information or guidance pertaining to their options. DONE button 478, if pressed, may cause the local thermostat to exit the installer setup process and revert to a previous screen such as home screen 352, as shown in FIG. 19, while NEXT button 480 may cause the local thermostat to progress to a subsequent screen within the View/Edit Setup menu option.

In some cases, pressing NEXT button 480 may cause the local thermostat to display an illustrative screen 484, as shown in FIG. 27. Screen 484 may include a banner 463 including a thermostat identifier, and an indication of the current menu location within the menu structure. In the illustrative example, the banner 463 informs the installer that they are providing data pertaining to the number of heating stages and the number of cooling stages for the equipment associated with the selected thermostat (THERMOSTAT 4). Screen 484 may include one or both of a Heat Stages block 486 and a Cool Stages block 488. Heat Stages block 486 may display a number of heating stages, and can be increased or decreased using up arrow 490 and/or down arrow 492, as desired. Cool Stages block 488 may display a number of cooling stages, and can be increased or decreased using up arrow 490 and/or down arrow 492, as desired. In some cases, the local thermostat may be intelligent enough so that only options relevant to the equipment that is indicated as being connected to the selected thermostat are provided in the menu. For example, if a single stage heat source is to be used, the Heat Stages block 486 may not be provided, or may be grayed out.

In some cases, these related parameters may be organized into a common setup category and displayed on the same screen 484. The number of heating stages and the number of cooling stages, while applicable to different HVAC equipment, are related to a common setup category as they both specify the number of stages. Grouping and displaying such related parameters into common setup category clusters on the display is believed to make the setup process more intuitive and efficient for the installer. Example common setup categories can include, for example, number of stages of an HVAC system, indoor air quality equipment parameters, heat pump lockout temperatures, humidity control parameters, ventilation parameters, cycles per hour (CPH) parameters, temperature set point stop limits, minimum off times, minimum on times, extended fan on times, display temperature offsets, and/or any other category as desired.

BACK button 473 permits the installer to revert to a previous screen while HELP button 474 may provide the installer with additional information or guidance pertaining to the displayed options. Done button 478, if pressed, may cause local thermostat to exit the installer setup process and revert to a previous screen such as home screen 352 (FIG. 19) while NEXT button 480 may cause the local thermostat to progress to a subsequent screen within the View/Edit Setup menu option.

Figure 17:
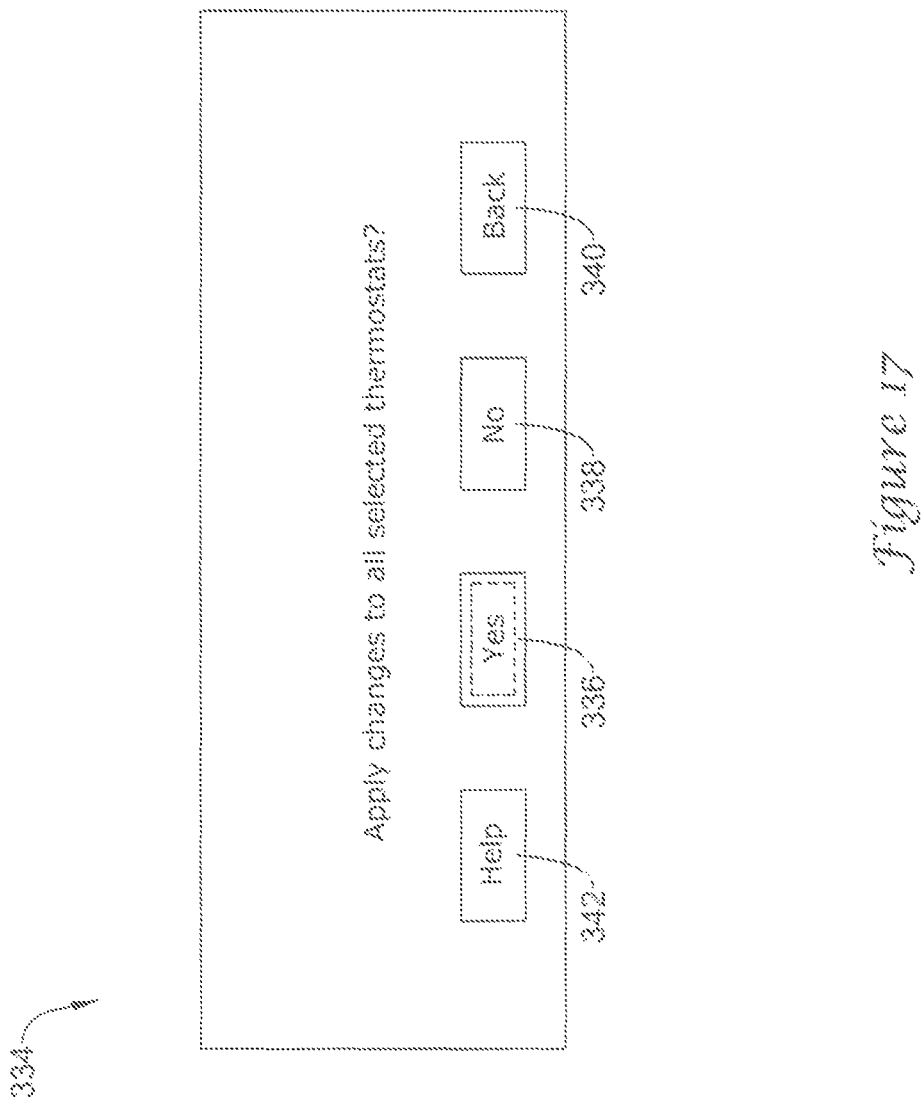
Figure 16:
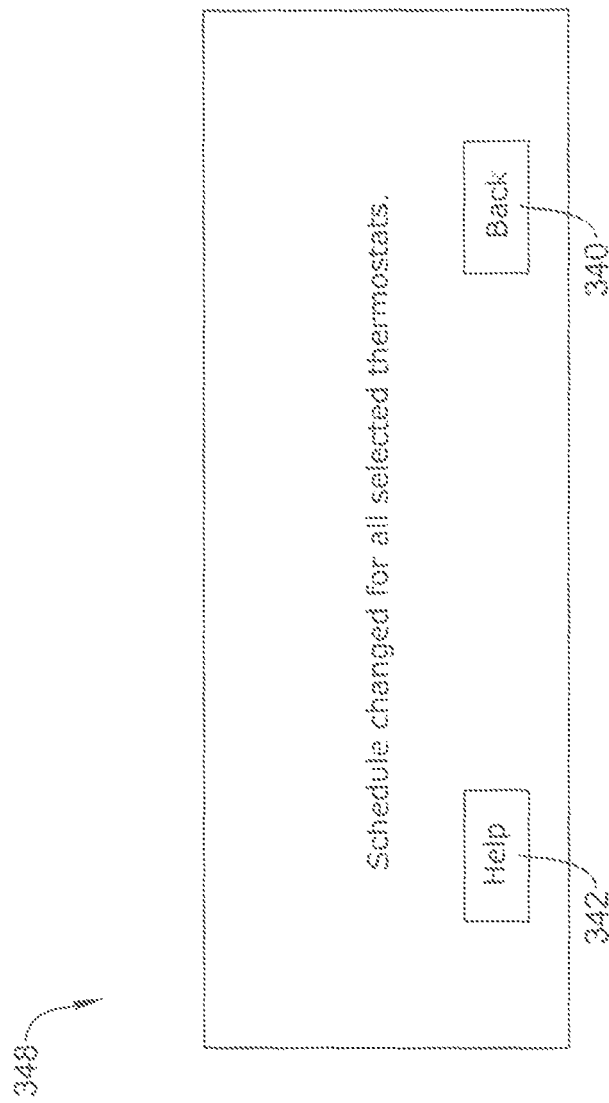

In some cases, an installer my change at least one installer configuration setting for two or more thermostats following a procedure similar to that discussed in reference to FIGS. 15-17. For example, the installer may first select the THER- MOSTATS button 182 provided along the navigational menu bar 176. Selection of the THERMOSTATS button 182 may result in a thermostats screen being displayed by the local thermostat. The installer may then select two or more thermostats from a list of available thermostats provided on the thermostats screen for which an installer configuration setting change is desired. The installer may then follow a procedure for changing at least one installer configuration setting similar to that discussed in reference to FIGS. 26 and 27. These installer configuration setting changes may then be saved to each of the selected thermostats.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed

What is claimed is:

1. A thermostat for controlling one or more components of an HVAC unit, the thermostat comprising:
 a thermostat housing that houses:
  at least one temperature sensor;
  a user interface including a display;
  a plurality of wire terminals for electrically connecting to a plurality of control wires that are connected to one or more components of the HVAC unit, for sending one or more control signals to the one or more components of the HVAC unit via the control wires;
  a communication port for communicating with at least a second thermostat over a communication channel; and
  a controller programmed to execute a remote access application for remotely accessing and communicating with at least the second thermostat via the communication port, wherein the remote access application executed by the controller of the thermostat is configured to concurrently display a thermostat identifier and at least one thermostat setting of at least the second thermostat on the display of the user interface of the thermostat, and to facilitate making a change to at least one thermostat setting of at least the second thermostat using the user interface.

2. The thermostat of claim 1, wherein the remote access application executed by the controller of the thermostat is configured to concurrently display the thermostat identifier, a current sensed temperature and at least one thermostat setting of at least the second thermostat on the display of the user interface, and wherein the at least one thermostat setting comprises a temperature set point.

3. The thermostat of claim 1, wherein the at least one thermostat setting comprises a scheduling parameter.

4. The thermostat of claim 1, wherein the at least one thermostat setting comprises an installer configuration setting.

5. The thermostat of claim 1, wherein the communication port of the thermostat includes a transmitter/receiver for sending and/or receiving information to and/or from the second thermostat.

6. The thermostat of claim 1, wherein the controller is configured to display a first screen comprising at least one thermostat parameter of the thermostat on the display, and at least a second screen comprising at least one thermostat parameter of the at least second thermostat on the display.

7. The thermostat of claim 1, wherein the controller is configured to display a location identifier on the display identifying a location of the thermostat from which the thermostat settings are currently being displayed on the display.

8. The thermostat of claim 1, wherein the controller is configured to remotely access and communicate with a plurality of remote thermostats including the second thermostat over the communication channel, the controller further configured to display a list of the plurality of remote thermostats on the display of the thermostat and allow a user to select one of the plurality of remote thermostats after which the controller is configured to concurrently display a thermostat identifier and at least one thermostat setting of the selected remote thermostat on the display of the user interface, and facilitate making a change to at least one thermostat setting of the selected remote thermostat using the user interface of the thermostat.

9. A thermostat for controlling one or more components of an HVAC unit, the thermostat comprising:
 a thermostat housing that houses:
  at least one temperature sensor;
  a user interface including a display;
  a plurality of wire terminals for electrically connecting to a plurality of control wires that are connected to one or more components of the HVAC unit, for sending one or more control signals to the one or more components of the HVAC unit via the control wires;
  a communication port for communicating with a plurality of thermostats over a communication channel; and
  a controller, wherein the thermostat is configured to display at least one thermostat setting from at least one of the plurality of thermostats on the display such that the at least one thermostat setting of at least one of the plurality of thermostats may be remotely manipulated through the user interface by a user, resulting in a change to the at least one thermostat setting, the controller further configured to apply the change to all of the plurality of thermostats.

10. The thermostat according to claim 9, wherein the controller is programmed to include a remote access function for remotely accessing and communicating with each of the plurality of thermostats, wherein the remote access function is configured to display at least one thermostat setting from a user selected one of the plurality of thermostats on the display of the user interface, and to facilitate making a change to the at least one thermostat setting of the user selected one of the plurality of thermostats via the user interface.

11. The thermostat of claim 10, wherein the at least one thermostat setting comprises an installer configuration setting.

12. The thermostat of claim 10, wherein the at least one thermostat setting comprises a temperature set point.

13. The thermostat of claim 10, wherein the at least one thermostat setting is a scheduling parameter.

14. A system for controlling one or more components of a plurality of HVAC units situated in different locations within a building structure, the system comprising:

a plurality of thermostats including a first thermostat and a second thermostat, the first and second thermostats in communication with one another over a communication network, the first and second thermostats configured to remotely access and communicate with each other over the communication network, the first thermostat comprising:

a thermostat housing that houses:
  at least one temperature sensor;
  a user interface including a display;
  a plurality of wire terminals for electrically connecting to a plurality of control wires that are connected to one or more components of the HVAC unit, for sending one or more control signals to the one or more components of the HVAC unit via the control wires;
  a communication port for communicating with the second thermostat over the communication network; and
  a controller programmed to execute a remote access application for remotely accessing and communicating with the second thermostat over the communication network via the communication port, wherein the remote access application is configured to provide two-way communication with the second thermostat such that the first thermostat is configured to display at least one thermostat setting of the second thermostat on the display of the user interface of the first thermostat, and to facilitate making a change to at least one thermostat
setting of the second thermostat using the user interface of the first thermostat; and wherein the second thermostat includes a controller programmed to execute a remote access application that is configured to display at least one thermostat setting of the first thermostat on a display of a user interface of the second thermostat, and to facilitate making a change to at least one thermostat setting of the first thermostat using the user interface of the second thermostat.

15. The system of claim 14, wherein each of the first and second thermostats comprises a transmitter/receiver for sending and/or receiving information to and from at least one other thermostat.

16. The system of claim 14, wherein the at least one thermostat setting comprises a temperature set point.

17. The system of claim 14, wherein the at least one thermostat setting is a scheduling parameter.

18. The thermostat of claim 14, wherein the at least one thermostat setting is an installer configuration setting.

19. The system of claim 14, wherein the controller of the first thermostat is configured to display a first screen comprising at least one thermostat setting of the first thermostat on the display, and at least a second screen comprising at least one thermostat setting of the second thermostat on the display.

20. The thermostat of claim 1, wherein at least the second thermostat that is being remotely accessed and communicated with is configured to display on a user interface a visual indicator indicating to a user that it is being remotely accessed.

* * * * *